US008105741B2

(12) United States Patent
Norikane et al.

(10) Patent No.: US 8,105,741 B2
(45) Date of Patent: Jan. 31, 2012

(54) METHOD AND APPARATUS FOR MANUFACTURING TONER, AND ELECTROPHOTOGRAPHIC TONER MANUFACTURED BY THE METHOD

(75) Inventors: Yoshihiro Norikane, Kanagawa (JP); Shinji Ohtani, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 824 days.

(21) Appl. No.: 12/119,606

(22) Filed: May 13, 2008

(65) Prior Publication Data

US 2008/0241727 A1 Oct. 2, 2008

(30) Foreign Application Priority Data

May 14, 2007 (JP) ................................ 2007-127691

(51) Int. Cl.
*G03G 9/00* (2006.01)
*B29C 67/02* (2006.01)

(52) U.S. Cl. ............... 430/108.1; 430/110.4; 430/137.2; 425/6

(58) Field of Classification Search ............... 430/108.1, 430/110.4, 137.2; 425/6
See application file for complete search history.

(56) References Cited

U.S. PATENT DOCUMENTS

2003/0224271 A1 12/2003 Teshima
2006/0210909 A1* 9/2006 Ohtani ....................... 430/137.1
2006/0240354 A1 10/2006 Ohtani
2008/0063971 A1* 3/2008 Watanabe et al. .......... 430/110.4

FOREIGN PATENT DOCUMENTS

EP 1344562 A2 9/2003
EP 1703332 A2 9/2006
JP 62-46226 10/1987
JP 6-40984 6/1994
JP 2006-293320 10/2006
JP 2006-297325 11/2006

OTHER PUBLICATIONS

Dec. 3, 2009 European official action in connection with a European Patent Application No. 08 251 675.8.
Jun. 26, 2009 European search report in connection with a counterpart European patent application No. 08 25 1675.

* cited by examiner

*Primary Examiner* — Thorl Chea
(74) *Attorney, Agent, or Firm* — Cooper & Dunham LLP

(57) ABSTRACT

A method for manufacturing toner includes steps of supplying, periodically dispensing, and solidifying. The supply step supplies a liquid to be atomized, which includes at least a resin and a colorant. The periodic dispensation step periodically dispenses droplets of the liquid through an atomizing unit. The solidification step solidifies the dispensed droplets into toner particles. The atomizing unit includes a thin film, a vibration actuator, and multiple holes. The thin film has a relatively stiff portion and a relatively elastic portion, and is configured to contact the liquid. The vibration actuator is connected to and supports a periphery of the thin film, and is configured to induce vibration of the thin film. The multiple holes are formed in the relatively stiff portion, and are configured to discharge droplets therethrough when the thin film vibrates.

18 Claims, 9 Drawing Sheets

METHOD AND APPARATUS FOR MANUFACTURING TONER, AND ELECTROPHOTOGRAPHIC TONER MANUFACTURED BY THE METHOD

TECHNICAL FIELD

This disclosure relates to a method and apparatus for manufacturing toner, and electrophotographic toner manufactured by the method, and more particularly, to a method and apparatus for manufacturing toner through a spray granulation process, and electrophotographic toner manufactured through the spray granulation process by the toner manufacturing method.

DISCUSSION OF THE BACKGROUND

Electrophotographic developers are used to develop a latent image into visible form in image forming techniques including electrophotography, electrostatic recording, electrostatic printing, and the like. In a typical development process, a developer is applied to a photoconductive surface having an electrostatic latent image thereon to form a visible image. The developed image is then transferred to a recording medium such as paper in a transfer process, and fixed thereon by fusing the developer in a subsequent fixing process.

There are various types of such electrophotographic developers, including two-component developers formed of carrier and toner particles and one-component developers primarily formed of toner particles that are either magnetic or non-magnetic.

Conventionally, dry toners produced through pulverization processes are widely used in electrophotographic developers. Pulverized toner manufacture involves blending a toner binder, such as styrene or polyester, with other substances including colorant, and melting and cooling the blended materials. The resultant mixture is then crushed and pulverized to form dry toner particles.

Recent studies have investigated use of polymerization processes in toner manufacture, including suspension polymerization, emulsion aggregation, and solution polymerization, where toner particles are obtained through polymerization in an aqueous medium to which a dispersant is added. For example, in a solution polymerization process, toner materials are dispersed and dissolved in a volatile solvent (e.g., a low-boiling-point organic compound), and the resultant solution is emulsified in the presence of a dispersant to form droplets in an aqueous medium. The solvent contained in the droplets is removed by subsequent volatilization so that the droplets contract in volume to form small solid particles. The solution polymerization process is superior to the other polymerization processes because of its ability to handle a wide range of resins including polyesters, which can be used to produce color toners with enhanced transparency and smoothness of printed images.

However, the polymerization methods mentioned above have several drawbacks due to the use of dispersant in an aqueous phase, which make their application to toner manufacturing less successful. For example, dispersant remaining on toner particles after polymerization may affect charging properties and degrade environmental stability of the toner, and removing such dispersant residues by washing requires large quantities of water.

Alternatively, a known process using spray drying can obtain toner particles without involving dispersion in an aqueous medium. In spray drying production of toner, a liquid prepared by melting or dissolving toner materials is atomized into fine droplets, and toner particles are obtained by drying the liquid droplets. Unfortunately, conventional spray drying processes do not offer toner particles with desired properties, such as smooth surface, small size, narrow particle size distribution, etc., and various methods have been proposed in an attempt to provide high quality spray-dried toner.

For example, one approach uses a piezoelectric pulse source to actuate a nozzle which dispenses droplets of liquid upon application of pulses. Another version of this approach includes dispensing droplets by means of a thermal expansion at a nozzle actuated by a piezoelectric pulse source. Particulate toner is produced by drying the liquid droplets obtained through such processes. Both of these methods use a piezoelectric element dedicated to a single dispensing nozzle, which results in a low granulation rate, and therefore do not offer satisfactory productivity.

Another spray drying method uses a piezoelectric transducer as a vibration actuator. The vibration actuator is annular in shape and surrounds and supports multiple nozzles connected thereto. In use, the vibration actuator regularly contracts and expands to induce vibrations so that the multiple nozzles regularly vibrate to discharge droplets of liquid, and particles are obtained by solidifying the droplets in a subsequent drying process.

Although advantageous in terms of productivity, such a method does not provide satisfactory reliability and validity for toner manufacture applications. One reason is unevenness in vibration amplitude among the multiple nozzles, which results in lack of uniformity and homogeneity of the resulting liquid droplets and toner particles. Further, according to this method, the vibration is conducted only to an area defined by the annular transducer, which makes the nozzles susceptible to blocking when the material liquid contains a high proportion of solid contents and has a relatively high viscosity, e.g., 10 millipascal seconds (mPa·s), limiting its applicability to toner production processes.

Another method using a piezoelectric vibration actuator is also proposed in which the vibration actuator is connected to a perforated member having multiple nozzles, and droplets are dispensed through the nozzles when the perforated member vibrates. Such a method has not been described in detail, and still does not provide an adequate solution to the drawbacks encountered by the above-mentioned techniques.

BRIEF SUMMARY

This disclosure describes a novel method for manufacturing toner through spray granulation process.

In an aspect of the disclosure, the novel method includes steps of supplying, periodically dispensing, and solidifying. The supply step supplies a liquid to be atomized, which includes at least a resin and a colorant. The periodic dispensation step periodically dispenses droplets of the liquid through an atomizing unit. The solidification step solidifies the dispensed droplets into toner particles. The atomizing unit includes a membrane, a vibration actuator, and multiple nozzles. The membrane has a relatively stiff portion and a relatively elastic portion, and is configured to contact the liquid. The vibration actuator is connected to and supports a periphery of the membrane, and is configured to induce vibration of the membrane. The multiple nozzles are formed in the relatively stiff portion, and are configured to discharge droplets when the membrane vibrates.

This patent specification further describes a novel granulation apparatus used to manufacture toner through spray granulation process.

In an aspect of the present disclosure, a novel granulation apparatus includes a reservoir, an atomizing unit, and a solidification unit. The reservoir is configured to supply a liquid to be atomized, which includes at least a resin and a colorant. The atomizing unit is configured to periodically dispense droplets of the liquid. The solidification unit is configured to solidify the dispensed droplets into toner particles. The atomizing unit includes a membrane, a vibration actuator, and multiple nozzles. The membrane has a relatively stiff portion and a relatively elastic portion, and is configured to contact the liquid. The vibration actuator is connected to and supports a periphery of the membrane, and is configured to induce vibration of the membrane. The multiple nozzles are formed in the relatively stiff portion, and are configured to discharge droplets when the membrane vibrates.

This patent specification also describes a novel electrophotographic toner manufactured through a spray granulation process.

In an aspect of the present disclosure, a novel electrophotographic toner is manufactured by a granulation method. The granulation method includes steps of supplying, periodically dispensing, and solidifying. The supply step supplies a liquid to be atomized, which includes at least a resin and a colorant. The periodic dispensation step periodically dispenses droplets of the liquid through an atomizing unit. The solidification step solidifies the dispensed droplets into toner particles. The atomizing unit includes a membrane, a vibration actuator, and multiple nozzles. The membrane has a relatively stiff portion and a relatively elastic portion, and is configured to contact the liquid. The vibration actuator is connected to and supports a periphery of the membrane, and is configured to induce vibration of the membrane. The multiple nozzles are formed in the relatively stiff portion, and are configured to discharge droplets when the membrane vibrates.

BRIEF DESCRIPTION OF THE DRAWINGS

A more complete appreciation of the aforementioned and other aspects, features and advantages will be better understood by reference to the following detailed description when considered in connection with the accompanying drawings, wherein.

DETAILED DESCRIPTION OF EXEMPLARY EMBODIMENTS

Figure 1:
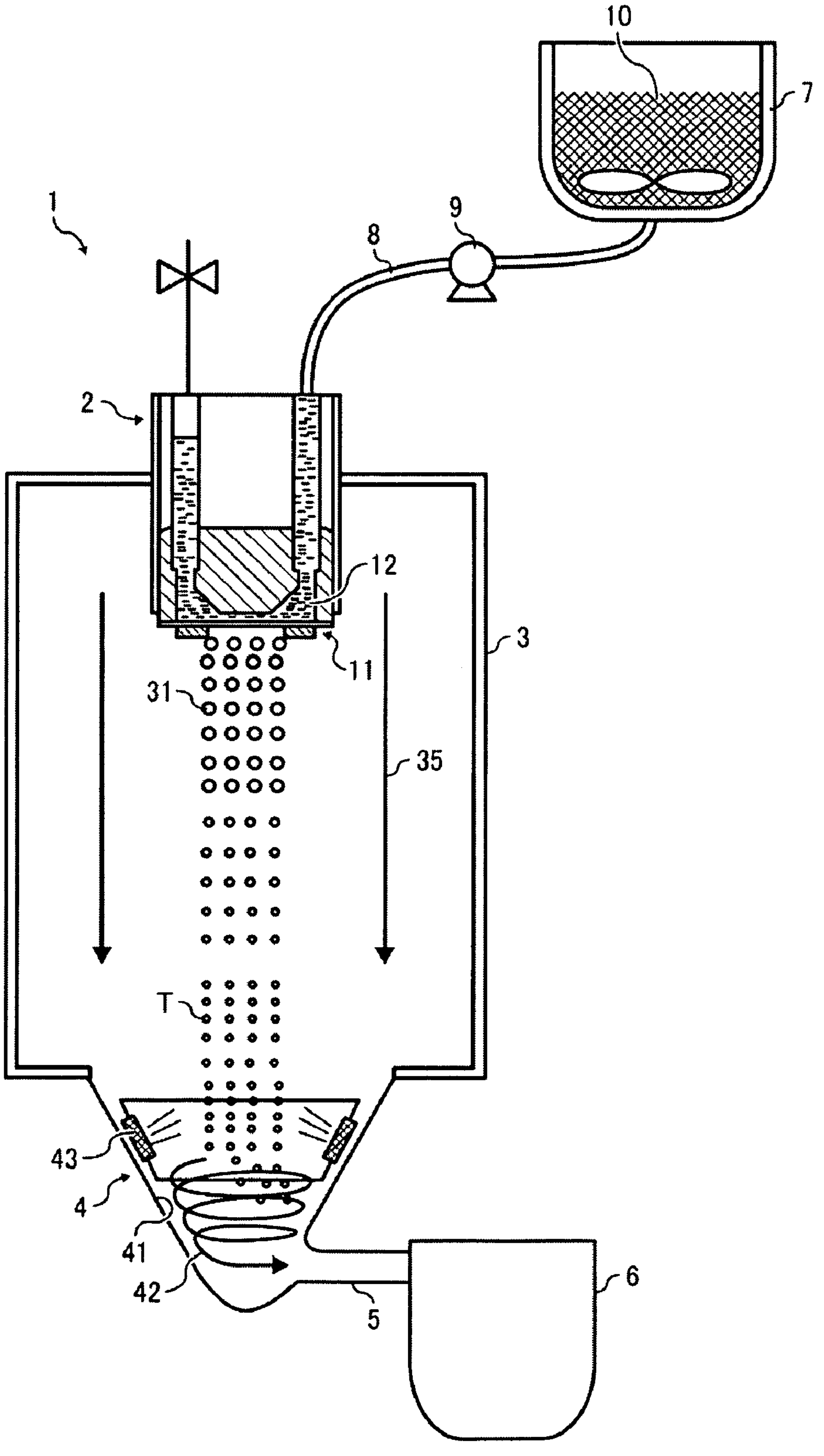
FIG. 1 is a schematic diagram illustrating a granulation apparatus according to an exemplary embodiment of this disclosure.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, examples and exemplary embodiments of this disclosure are described.

FIG. 1 is a schematic diagram illustrating a granulation apparatus 1 according to an exemplary embodiment of this disclosure.

As shown in FIG. 1, the granulation apparatus 1 includes a spray unit 2, a solidification chamber 3, a particle collector 4, an outlet tube 5, a collection reservoir 6, a feed tank 7, a feed line 8, and a pump 9. The spray unit 2 includes an atomizing head 11 and a fluid channel 12. The particle collector 4 includes a frusto-conical surface 41, a discharging device 43, and a blower device, not shown, for generating an air stream 42.

In the granulation apparatus 1, the feed tank 7 holds a liquid 10 and communicates with the spray unit 2 via the feed line 8 connected with the pump 9. The liquid 10 may be a solution or dispersion of raw materials including at least a resin and a colorant, which is prepared by using a suitable solvent or dispersant. The feed line 8 conducts the liquid 10 toward the spray unit 2 automatically when the spray unit 2 operates, and the pump 9 aides the delivery of liquid by generating pressure within the feed line 8 when needed, e.g., at startup of the spraying operation.

The liquid 10 entering the spray unit 2 is held in the channel 12 for delivery to the atomizing head 11. When a drive signal of a given frequency is applied, the atomizing head 11 breaks the liquid 10 up into fine droplets 31 by a vibratory motion as discussed in more detail later. The droplets 31 are sprayed into the solidification chamber 3 located downstream of the spray unit 2.

The solidification chamber 3 solidifies the incoming droplets 31 to form particulate toner T. In the illustrated embodiment, the solidification chamber 3 is configured as a drying unit which evaporates and removes the solvent or dispersant contained in the liquid droplets 31 to form solid toner particles. Specifically, the solidification chamber 3 employs a drying gas 35 that flows in a direction substantially the same as the droplets 31 to simultaneously convey and process the sprayed material. The drying gas 35 may be any gas including air, nitrogen, and the like, which has a dew point not greater than approximately −10° C. at atmospheric pressure.

The particulate toner T thus produced is collected by the particle collector 4 located directly downstream from the solidification chamber 3. In the collector 4, the incoming toner T is received by the frusto-conical surface 41 which tapers downwardly with a wide upper end opening to the solidification chamber 3 and a narrow lower end communicating with the collection reservoir 6 via the outlet tube 5. At the upper end of the frusto-conical surface 41, the discharging device 43 temporarily neutralizes charge on the toner T passing therethrough. The discharging device 43 may be a soft X-ray source 43A, not shown, capable of irradiating the toner T with a soft X-ray, or alternatively, a plasma source 43B, not shown, capable of generating plasma for discharging the toner T. After being discharged, the toner T is forced by the air stream 42 downward to the outlet tube 5. Preferably, the air stream 42 may be a cyclone, which can collect and deliver particles efficiently and reliably using centrifugal forces.

The toner T entering the outlet tube 5 is blown by the air stream 42 to settle in the collection reservoir 6. Any suitable mechanism may be used to assist in delivering the toner T, such as those pneumatically directing particles from the collector 4 or those sucking particles into the collection reservoir 6.

Preferably, the collector 4, the tube 5, and the collection reservoir 6 are grounded when forming these components of conductive materials. In addition, all the components of the granulation apparatus 1 are preferably designed to be explosion-proof.

Although the granulation apparatus 1 illustrated above produces toner from a solution or dispersion of raw materials so that the solidification process is performed through the evaporation of organic solvent, which causes solidification and contraction of the liquid droplets, it is possible to design the granulation apparatus 1 to accommodate other types of raw materials and/or solidification processes. For example, it is contemplated that the liquid 10 be toner ingredients melted and liquefied by heating the feed tank 7, and the solidification unit 3 form solid particles by cooling droplets of such a melt. It is also possible that the liquid 10 include a thermosetting material, in which case the solidification unit 3 performs heat-curing on sprayed droplets to obtain solid particles.

Additionally, although the granulation apparatus 1 of FIG. 1 is shown to include only one spray unit, the solidification chamber 3 may preferably be associated with multiple (e.g., from approximately 100 to 1,000) spray units.

Figure 2:
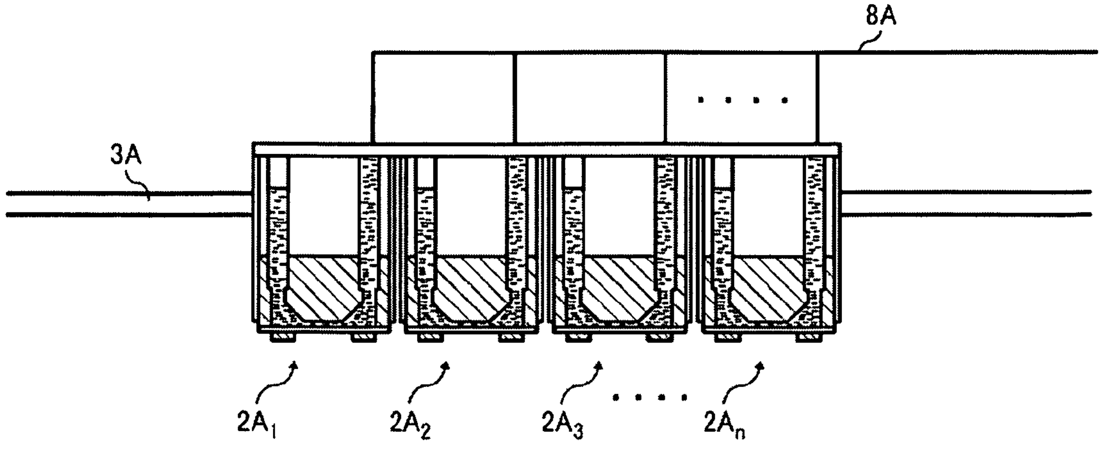
FIG. 2 shows a configuration of the granulation apparatus of FIG. 1 including multiple spray units.

FIG. 2 shows a configuration in which multiple spray units 2$A_1$ through 2$A_n$, identical in structure and function to the spray unit 2, are used in conjunction with the solidification chamber 3. The multiple spray units 2$A_1$ through 2$A_n$ are arranged on an upper wall 3A of the solidification chamber 3, and respectively connected to branches of the feed line 8A to receive the liquid 10 from the feed tank 7. This enables the granulation apparatus 1 to produce larger quantities of droplets and particles per unit of time, thus enhancing efficiency and productivity in toner manufacture through spray granulation.

Figure 3:
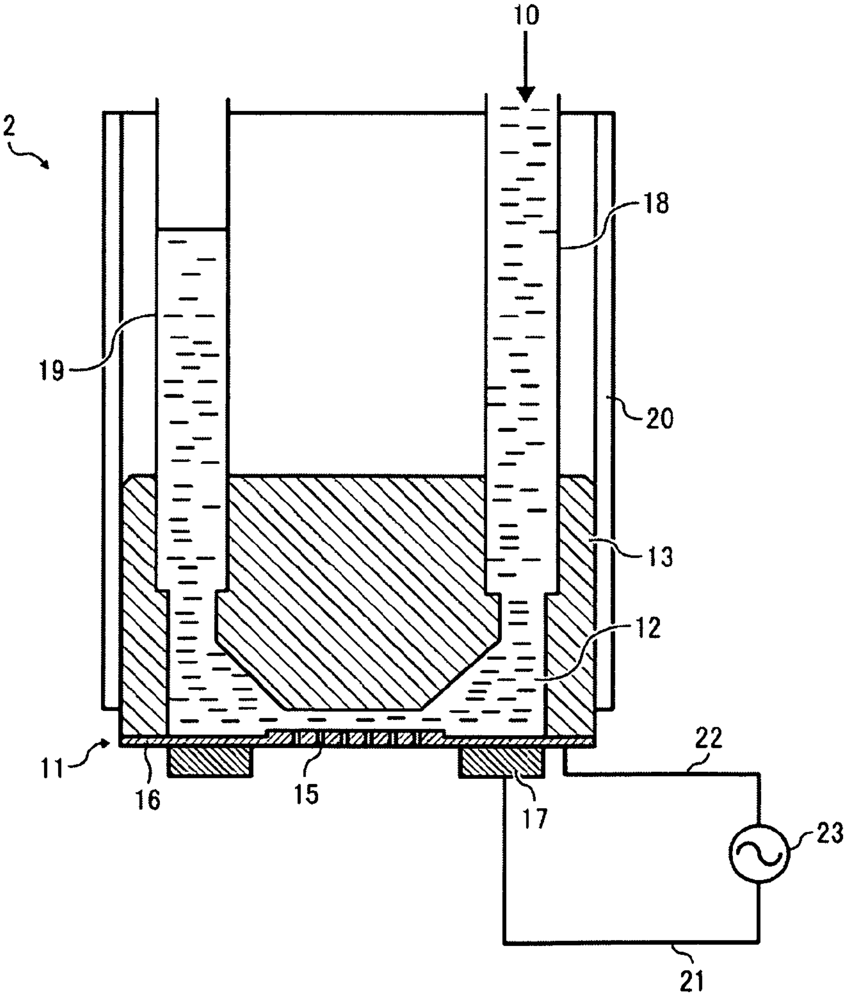
FIG. 3 is a cross-sectional view schematically illustrating an example of a spray unit included in the granulation apparatus of FIG. 1.

Referring now to FIG. 3, a cross-sectional view schematically illustrating an example of the spray unit 2 is described.

As shown in FIG. 3, the spray unit 2 includes a fluid chamber 13 which defines the channel 12 faced by the atomizing head 11 and to which a feed tube 18 and a bubble outlet tube 19 are connected. The feed tube 18 conducts the liquid 10 to the channel 12 while the bubble outlet tube 19 permits gas bubbles to be released from the liquid 10. The spray unit 2 is mounted on an upper side of the solidification chamber 3, not shown, by means of a supporting member 20 bonded to the fluid chamber 13. Alternatively, it is also possible to locate the spray unit 2 at a side wall or a bottom wall of the solidification chamber 3.

The atomizing head 11 includes a perforated thin film 16 having multiple perforations or holes 15, and an annular vibration actuator 17 combined with the thin film 16 and connected to a driver circuit 23 by leads 21 and 22. In use, the actuator 17 serves as an electromechanical transducer, and upon receiving an electrical signal from the driver circuit 23, converts the electrical energy to another form, for example, to mechanical flexural vibrations. This allows the thin film 16 to discharge the liquid 12 through the holes 15 as will be described hereinbelow.

Figure 4A:
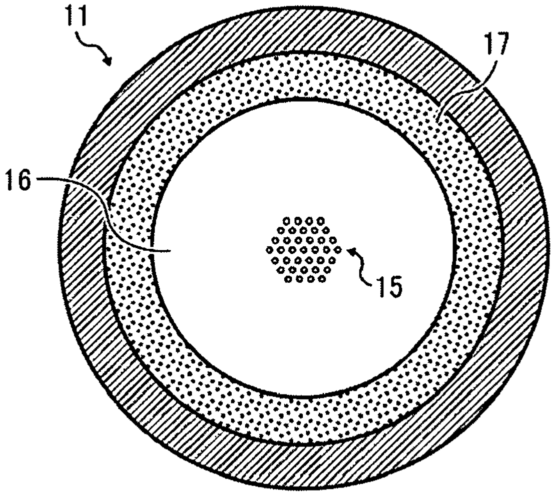
FIGS. 4A and 4B are bottom and cross-sectional views, respectively, schematically illustrating an example of an atomizing head included in the spray unit of FIG. 3.
Figure 4B:
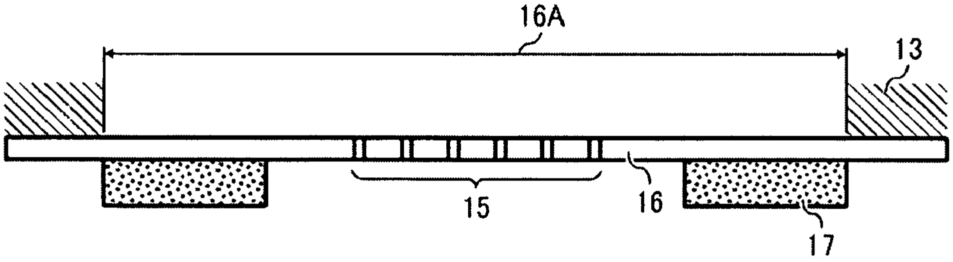

FIGS. 4A and 4B are schematic diagrams illustrating an example of the atomizing head 11. FIG. 4A provides a bottom view and FIG. 4B provides a cross-sectional view.

As shown in FIGS. 4A and 4B, the thin film 16 is circular in shape, having an outermost annular portion (shown as shaded in FIG. 4A) and an inner flexible circular portion 16A defined by the outermost annular portion. The outermost annular portion is bonded to the fluid chamber 13 at an upper surface with an appropriate solder or resin material insoluble in the liquid 10. The flexible portion 16A inwardly extends from the outermost annular portion and includes, at a periphery, an inner annular portion (shown as dotted in FIG. 4A) under which the actuator 17 is disposed to impart flexural vibrations. The holes 15, preferably from approximately 2 to approximately 3,000 in number, are formed in the flexible portion 16A and discharge droplets therethrough when the flexible portion 16A is actuated.

Although the thin film 16 and the holes 15 may be of any appropriate dimension, shape, and/or material, it is preferable that the thin film 16 be a metal plate of a thickness ranging from approximately 5 to approximately 500 μm, and the holes 15 be circular or elliptical in transverse cross-section with a diameter (in the case of circular cross-section) or a minor axis (in the case of elliptical cross-section) ranging from approximately 3 to approximately 50 μm, and more preferably from approximately 3 to approximately 35 μm. The circular or elliptical shape of holes help stabilize flow direction of discharged droplets, and the defined dimensions of the thin film and holes allow the spray unit 2 to dispense fine droplets of an extremely uniform size in the atomizing operation.

Further, while the actuator 17 may be any suitable device that can impart steady vibrations to the thin film 16 at a constant frequency, it is preferable to use a bimorph piezoelectric actuator capable of generating flexural vibrations. Such a piezoelectric element includes, for example, piezoelectric polymers such as polyvinylidene fluoride (PVDF), quartz crystals, and single piezoelectric crystals such as lithium niobate, lithium tantalite, and potassium niobate. Preferably, a piezoelectric ceramic such as lead zirconate titanate (PZT) may be used, in which case multiple PZT layers are stacked to obtain increased vibration displacement.

Figure 5:
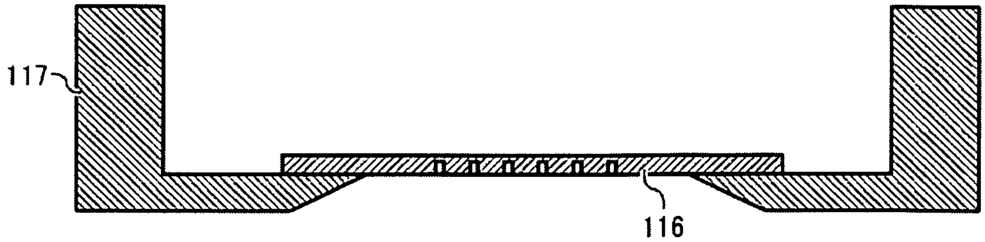
FIG. 5 shows an arrangement of an atomizing head.

The atomizing head 11 described in FIGS. 4A and 4B is advantageous in that arranging the annular actuator 17 to support the periphery of the flexible portion 16A results in a relatively large thin film displacement across a relatively large area (e.g., measuring more than 1 mm in diameter) compared to an arrangement in which an annular vibration actuator 117 surrounds and supports a perforated thin film 116 as shown in FIG. 5. This means that the atomizing head 11 may have an increased number of holes in the area where droplets of desired properties are reliably formed, which leads to enhanced efficiency in the atomizing operation.

Figure 6A:
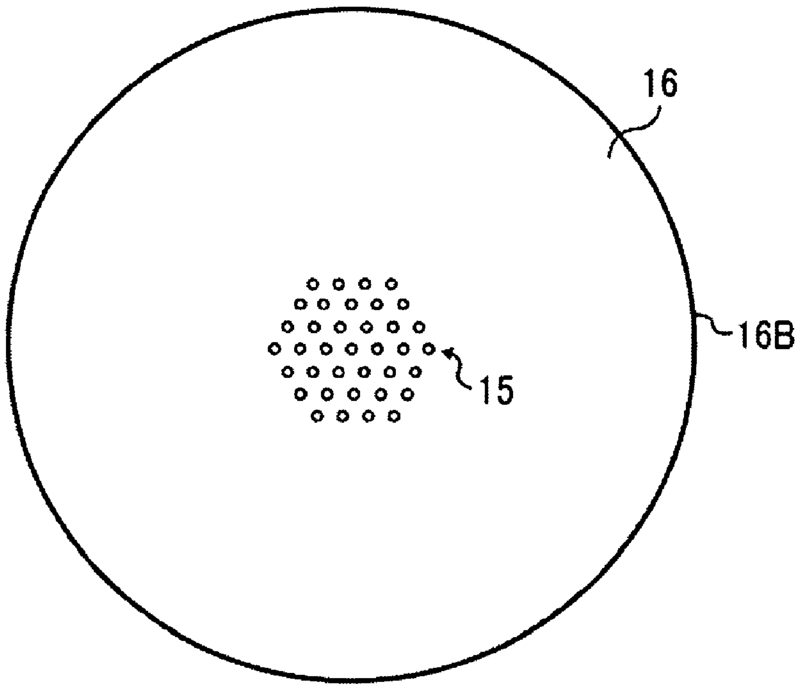
FIGS. 6A and 6B are schematic diagrams illustrating operating principles of a perforated thin film included in the atomizing head of FIGS. 4A and 4B.
Figure 6B:
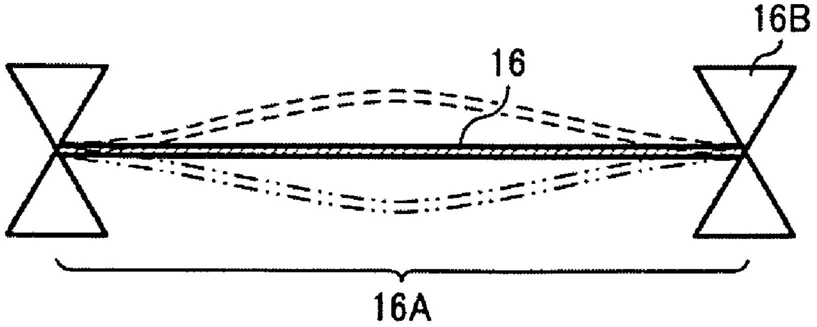

Referring now to FIGS. 6A and 6B, where the thin film 16 is shown with a planar surface for simplicity, schematic diagrams illustrating operating principles of the thin film 16 are described.

As shown in FIGS. 6A and 6B, the thin film 16 has a fixed perimeter 16B corresponding to the outer edge of the flexible portion 16A of FIGS. 4A and 4B. Imparting vibration to the thin film 16 excites a vertical displacement or oscillation of the flexible portion 16A, in which the flexible portion 16A periodically bends upward and downward as indicated by dashed and dotted lines in FIG. 6B to allow the holes 15 to periodically produce droplets in the atomizing operation as will be described later.

Figure 7:
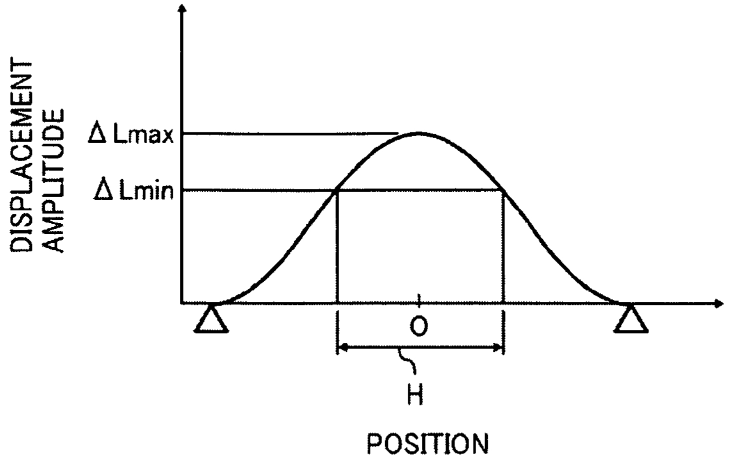
FIG. 7 depicts a vibration mode of a planar circular thin film with a fixed perimeter.
Figure 8:
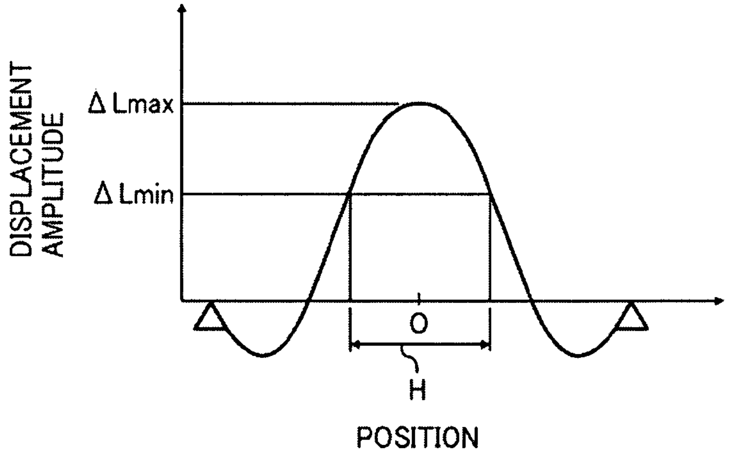
FIG. 8 depicts another vibration mode of the planar circular thin film of FIG. 7.
Figure 9:
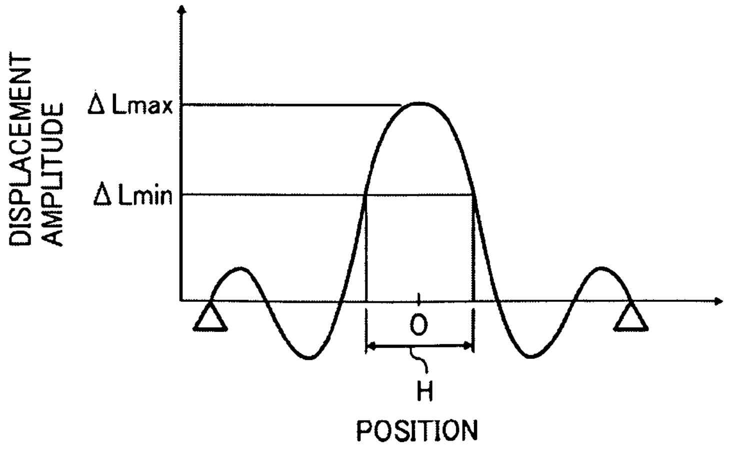
FIG. 9 depicts still another vibration mode of the planar circular thin film of FIG. 7.

For illustrating the oscillating movement of the thin film 16, various vibration modes of a planar circular thin film with a fixed perimeter are described in FIGS. 7 through 9. FIG. 7 depicts a fundamental vibration mode, and FIGS. 8 and 9 depict higher-order vibration modes, where an amplitude of displacement ΔL is plotted against particular positions along a given thin film diameter.

As shown in the drawings, the thin film displacement occurs symmetrically about a central axis, where the displacement amplitude ΔL is maximal at a center O of the thin film and zero at an outer perimeter, indicating a nodal line. In particular, the fundamental vibration mode (FIG. 7) has no node across the thin film, while the higher-order modes (FIGS. 8 and 9) possess more than one concentric node in addition to the perimeter node. In operating the atomizing head 11, it is desirable that the thin film 16 be actuated with the fundamental vibration mode, and no node be present along the thin film diameter.

Figure 10A:
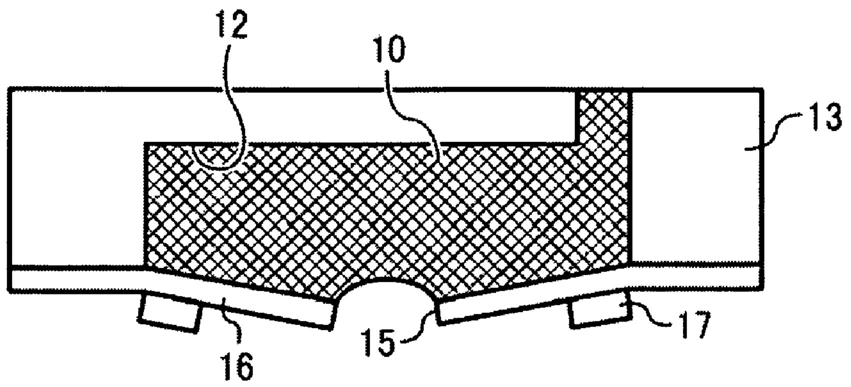
FIGS. 10A and 10B are schematic diagrams illustrating a dispensing action of the atomizing head of FIGS. 4A and 4B.
Figure 10B:
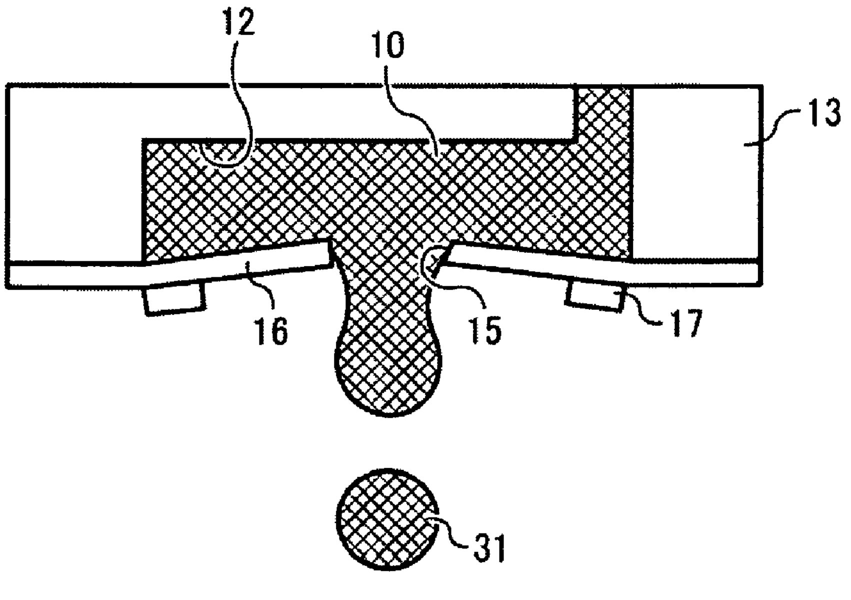

Referring to FIGS. 10A and 10B, schematic diagrams illustrating a dispensing action of the atomizing head 11 are described.

As shown in FIGS. 10A and 10B, the flexural vibration of the actuator 17 causes the thin film 16 to oscillate between an advanced position (i.e., bent away from the fluid channel 12 as shown in FIG. 10A) and a retracted position (i.e., bent toward the fluid channel 12 as shown in FIG. 10B). When the thin film 16 vibrates at a given vibration velocity Vm, a pressure Pac proportional to the vibration velocity Vm is exerted on the liquid 10 adjacent to the vibrating thin film 16. The pressure Pac expels the liquid 10 through the holes 15 so that the liquid 10 released into the air form the droplets 31, which become spherical in shape due to gas-liquid surface tension.

In the above description, the pressure Pac refers to an acoustic pressure which results from radiation impedance Zr of a medium (i.e., the liquid 10 in the present case), and can be expressed by the following equation:

$$Pa(r,t)=Zr*Vm(r,t) \tag{1}$$

In the atomizing head 11, the vibration velocity Vm has periodic variations (either sinusoidal, rectangular, or the like) and therefore is defined as a function of time. Since the displacement amplitude ΔL varies across the area of the thin film 16, or (in the case of the symmetric displacement) along the radius of the thin film 16, the vibration velocity Vm is also defined as a function of position, or as a function of radial position. Thus, the pressure Pac changes depending on position and time during the operation of the atomizing head 11.

Additionally, the thin film 16 may preferably vibrate at frequencies ranging from approximately 20 kilohertz (kHz) to approximately 2.0 megahertz (MHz), and more preferably, from approximately 50 kHz to approximately 500 kHz. Vibrating the thin film 16 at frequencies higher than 20 kHz sufficiently stimulates the liquid 10 so that fine particles such as pigment and wax disperse well in the liquid 10. The particle dispersion in the liquid 10 is further promoted by setting the acoustic pressure Pac to be approximately 10 kilopascal (kPa) or higher.

In the atomizing operation, the diameter of droplets generated by a specific hole depends on the displacement amplitude ΔL at a point where the hole is located. A large displacement amplitude results in large droplets, and a small displacement amplitude may cause formation of undesirably small droplets or lack of droplet formation. Consequently, droplets sufficiently large and uniform in size can be obtained by arranging the multiple holes 15 in a specific area across which the displacement amplitude ΔL is sufficiently large and substantially uniform. With reference to FIGS. 7 through 9, such a specific area is defined as a region H around the center O, in which a ratio R of maximum displacement amplitude ΔLmax to minimum displacement amplitude ΔLmin (i.e., R=ΔLmax/ΔLmin) is not greater than 2.0. Arranging the holes 16 in the region H may effectively reduce variations in droplet size, thus ensuring the uniformity of resultant toner particles required to achieve good image quality.

Additionally, the uniformity of toner particles is greatly affected by formation of smaller “satellite” droplets (e.g., about one-tenth the size of main droplets) which may occur depending on properties of the liquid being dispensed. In order to avoid formation of such satellite droplets in handling toner materials, the acoustic pressure Pac adjacent to the region H is preferably in the range of approximately 10 to approximately 500 kPa, and more preferably in the range of approximately 10 to 100 kPa. Such pressure ranges are effective when the dispensed liquid has a viscosity not greater than 20 millipascal seconds (mPa·s) and a surface tension ranging from 20 to 75 millinewtons per meter (mN/m).

According to this disclosure, the thin film 16 has a symmetric configuration in terms of materials and/or thickness distribution, which provides uniformity of the displacement amplitude ΔL over an extended area in the atomizing operation, enabling production of particulate toner with uniform size and excellent monodispersibility.

Specifically, the thin film 16 includes a relatively stiff center portion 101 extending from a center thereof and a relatively elastic peripheral portion 102 surrounding the center portion 101, each of which is symmetrical about a central axis of the thin film 16. Preferably, the center portion 101 may have a Young’s modulus ten or more times greater than that of the peripheral portion 102. Such variation in stiffness may be obtained by forming the thin film 16 with different types of materials and/or combined layers of different materials, for example, the stiff center portion 101 made of ceramic and the elastic peripheral portion 102 made of nickel or stainless steel (SUS).

Alternatively, such stiffness variation may also be obtained by forming the thin film 16 with thickness varying between the center and peripheral portions 101 and 102.

Figure 11A:
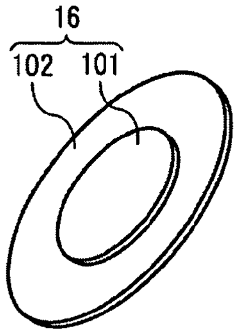
FIGS. 11A through 13 schematically illustrate exemplary configurations of the thin film of FIGS. 6A and 6B.

FIGS. 11A through 13 schematically illustrate exemplary configurations of the thin film 16 with the center and peripheral portions 101 and 102 having different thicknesses. FIGS. 11A and 11B provide perspective and cross-sectional views of one configuration of the thin film 16, and FIGS. 12 and 13 each provides a cross-sectional view of another configuration of the thin film 16.

Figure 11B:
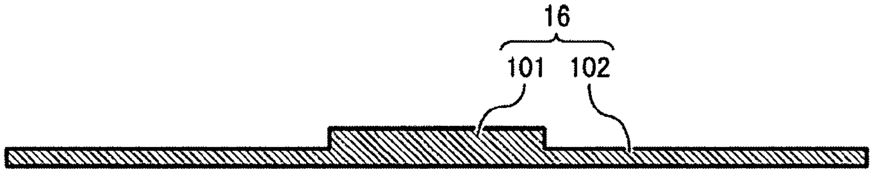

As shown in FIGS. 11A and 11B, the thin film 16 may be relatively thick in the center portion 101 and relatively thin in the peripheral portion 102. The holes 15, not shown, are located in the center portion 101, which is thicker and therefore stiffer than the peripheral portion 102.

Figure 12:
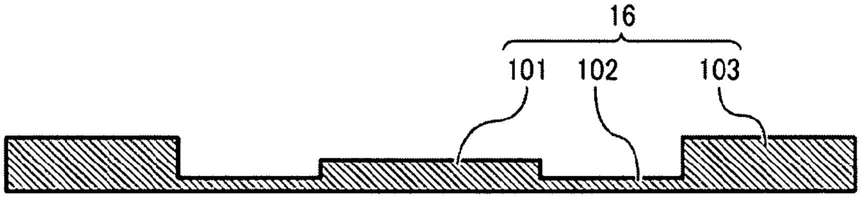

Alternatively, the thin film 16 may have a second peripheral portion 103 in addition to the center and peripheral portions 101 and 102 as shown in FIG. 12. The second peripheral portion 103 is thicker than the peripheral portion 102, and when in use serves to connect the thin film 16 to the fluid chamber 13.

Figure 13:
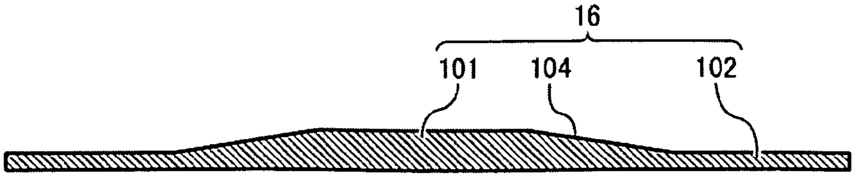

Still alternatively, the thin film 16 may have a slope portion 104 that tapers in thickness from the center portion 101 toward the peripheral portion 102 as shown in FIG. 13. This configuration is superior to those illustrated in FIG. 11A through FIG. 12 since the linearly varying thickness ensures good stability of the thin film 16 compared to configurations having stepped profiles.

The thin film 16 with varying thickness may be prepared using an electroforming technique, whereby the thick and thin portions 101 and 102, respectively, and the multiple holes 15, can be integrally formed of a single material such as nickel. Alternatively, it is also possible to prepare the thin film 16 by bonding together layers of different types of metals and/or ceramics.

A description is now given of dispositions of the holes within the thin film.

Figure 14:
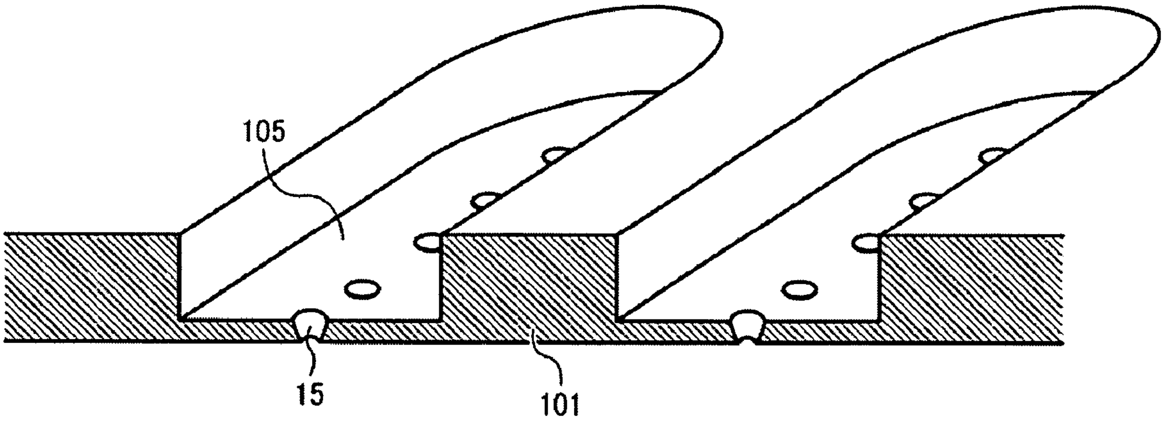
FIG. 14 is an enlarged diagram schematically illustrating an arrangement of a center portion of the thin film of FIGS. 6A and 6B.

FIG. 14 is an enlarged schematic illustration of an arrangement of the center portion 101 with the holes 15 formed therein.

As shown in FIG. 14, the holes 15 are arranged in a recessed area 105 of the center portion 101 which is by definition thinner than the other areas of the center portion 101. Preferably, the holes 15 are aligned at an interval of approximately 100 μm or greater, so as to reduce interference between neighboring holes and prevent a spray of droplets from collecting and coalescing. To maximize the number of holes in a single thin-film, the interval between the holes 15 is preferably approximately 1,000 μm or smaller.

As described hereinabove, the granulation apparatus 1 and the granulation method according to this disclosure enable efficient production of toner particles with uniform size and excellent monodispersibility, wherein the perforated thin film 16 with the specified configurations provides homogeneity in the vibration amplitude and the size of droplets being dispensed.

Further, the granulation apparatus 1 and the granulation method according to this disclosure enhances productivity and reliability in toner manufacture due to the specified region H for arranging holes, in which the thin film 16 vibrates at a relatively large and uniform displacement amplitude so that the holes 15 may form droplets of desired properties without clogging, and which is extended by arranging the thin film 16 with the annular vibration actuator 17 surrounding the flexible portion 16A of the thin film 16.

The following portion describes toner according to this disclosure, which is manufactured by the granulation apparatus and method disclosed hereinabove.

The toner disclosed herein has a nearly monodisperse particle diameter distribution. The toner preferably has a particle diameter distribution (i.e., the ratio of the weight average particle diameter to the number average particle diameter) ranging from approximately 1.00 to 1.05, and a weight average particle diameter ranging from approximately 1 to approximately 20 μm.

The toner prepared by the granulation method of this disclosure can be easily re-dispersed, (i.e., suspended) in an airflow due to electrostatic repulsion effects. Therefore, the toner can be transported to the developing region without using a transport means used in conventional electrophotography. In other words, the toner can be satisfactorily transported even if the airflow is weak. The toner can be transported to the developing region by a simple air pump to develop an electrostatic latent image. The electrostatic latent image is faithfully developed with the toner by the so-called powder cloud development, in which the image formation is not disturbed by the airflow.

The toner disclosed herein can also be used for conventional developing methods. In this case, image forming members such as a carrier and a developing sleeve do not need to have a function of friction-charging, while having a function of transporting a toner. Therefore, various kinds of materials can be used for the image forming members, resulting in improvement of durability and reduction of manufacturing cost.

The toner disclosed herein includes a release agent, a graft polymer including a polyolefin resin unit and a vinyl resin unit, and other constituents used for conventional toners. For example, the toner disclosed herein can be prepared as follows:

dissolving a binder resin such as a styrene-acrylic resin, a polyester resin, a polyol resin, and an epoxy resin, in an organic solvent;

dispersing a colorant therein;

dispersing or dissolving a release agent and a graft polymer including a polyolefin resin unit and a vinyl resin unit therein, to prepare a toner constituent liquid;

forming liquid droplets of the toner constituent liquid by the method mentioned above; and drying the liquid droplets to form solid particles.

The toner constituent liquid can also be prepared by melt-kneading toner constituents, and then dissolving or dispersing the melt-kneaded mixture in an organic solvent.

A toner including a release agent and a graft polymer including a polyolefin resin unit and a vinyl resin unit has not only good hot offset resistance but also hole clogging resistance because the release agent can be finely dispersed in the toner without causing aggregation.

(Toner)

The toner disclosed herein includes a resin, a colorant, a release agent, and a graft polymer including a polyolefin resin unit and a vinyl resin unit, and optionally includes a charge controlling agent, a magnetic material, a fluidity improving agent, a lubricant, a cleaning auxiliary agent, a resistance controlling agent, etc., if desired.

(Resin)

As the resin, a binder resin can be used.

Specific examples of the binder resins include, but are not limited to, vinyl homopolymers and copolymers of vinyl monomers (such as a styrene monomer, an acrylic monomer, and a methacrylic monomer), polyester resins, polyol resins, phenol resins, silicone resins, polyurethane resins, polyamide resins, furan resins, epoxy resins, xylene resins, terpene resins, coumarone-indene resins, polycarbonate resins, and petroleum resins.

Specific examples of the styrene monomers include, but are not limited to, styrenes such as styrene, o-methylstyrene, m-methylstyrene, p-methylstyrene, p-phenylstyrene, p-ethylstyrene, 2,4-dimethylstyrene, p-n-amylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, and p-nitrostyrene; and derivatives thereof.

Specific examples of the acrylic monomers include, but are not limited to, acrylic acids and esters thereof (i.e., acrylates) such as methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chloroethyl acrylate, and phenyl acrylate.

Specific examples of the methacrylic monomers include, but are not limited to, methacrylic acids and esters thereof (i.e., methacrylates) such as methyl methacrylate, ethyl methacrylate, propyl methacrylate, n-butyl methacrylate, isobutyl methacrylate, n-octyl methacrylate, n-dodecyl methacrylate, 2-ethylhexyl methacrylate, stearyl methacrylate, phenyl methacrylate, dimethylaminoethyl methacrylate, and diethylaminoethyl methacrylate.

Specific examples of other vinyl monomers include, but are not limited to, the following compounds:

(1) monoolefins such as ethylene, propylene, butylene, and isobutylene;

(2) polyenes such as butadiene and isoprene;

(3) halogenated vinyl compounds such as vinyl chloride, vinylidene chloride, vinyl bromide, and vinyl fluoride;

(4) vinyl esters such as vinyl acetate, vinyl propionate, and vinyl benzoate;

(5) vinyl ethers such as vinyl methyl ether, vinyl ethyl ether, and vinyl isobutyl ether;

(6) vinyl ketones such as vinyl methyl ketone, vinyl hexyl ketone, and methyl isopropenyl ketone;

(7) N-vinyl compounds such as N-vinylpyrrole, N-vinylcarbazole, N-vinylindole, and N-vinylpyrrolidone;

(8) vinylnaphthalenes;

(9) derivatives of acrylic acid or methacrylic acid such as acrylonitrile, methacrylonitrile, and acrylamide;

(10) unsaturated dibasic acids such as maleic acid, citraconic acid, itaconic acid, alkenyl succinic acid, fumaric acid, and mesaconic acid;

(11) unsaturated dibasic acid anhydrides such as maleic acid anhydride, citraconic acid anhydride, itaconic acid anhydride, and alkenyl succinic acid anhydride;

(12) unsaturated dibasic acid monoesters such as monomethyl maleate, monoethyl maleate, monobutyl maleate, monomethyl citraconate, monoethyl citraconate, monobutyl citraconate, monomethyl itaconate, monomethyl alkenyl succinate, monomethyl fumarate, and monomethyl mesaconate;

(13) unsaturated dibasic acid esters such as dimethyl maleate and dimethyl fumarate;

(14) α,β-unsaturated acids such as crotonic acid and cinnamic acid;

(15) α,β-unsaturated acid anhydrides such as crotonic acid anhydride and cinnamic acid anhydride;

(16) anhydrides of α,β-unsaturated acids with lower fatty acids; anhydrides of alkenyl malonic acid, alkenyl glutaric acid, and alkenyl adipic acid; and monoester-like monomers thereof having a carboxyl group;

(17) hydroxyalkyl acrylates and methacrylates such as 2-hydroxyethyl acrylate, 2-hydroxyethyl methacrylate, and 2-hydroxypropyl methacrylate; and

(18) monomers having a hydroxyl group such as 4-(1-hydroxy-1-methylbutyl)styrene and 4-(1-hydroxy-1-methylhexyl)styrene.

The vinyl homopolymers and copolymers of the vinyl monomers may have a cross-linked structure formed using a cross-linking agent having 2 or more vinyl groups. Specific examples of the cross-linking agents having 2 or more vinyl groups include, but are not limited to, aromatic divinyl compounds such as divinylbenzene and divinylnaphthalene; diacrylate (or dimethacrylate) compounds in which acrylates (or methacrylates) are bound together with an alkyl chain (e.g., ethylene glycol diacrylate (or dimethacrylate), 1,3-butylene glycol diacrylate (or dimethacrylate), 1,4-butanediol diacrylate, 1,5-pentanediol diacrylate (or dimethacrylate), 1,6-hexanediol diacrylate (or dimethacrylate), neopentyl glycol diacrylate (or dimethacrylate)); diacrylate (or dimethacrylate) compounds in which acrylates (or methacrylates) are bound together with an alkyl chain having an ether bond (e.g., diethylene glycol diacrylate (or dimethacrylate), triethylene glycol diacrylate (or dimethacrylate), tetraethylene glycol diacrylate (or dimethacrylate), polyethylene glycol #400 diacrylate (or dimethacrylate), polyethylene glycol #600 diacrylate (or dimethacrylate), dipropylene glycol diacrylate (or dimethacrylate)); diacrylate (or dimethacrylate) compounds in which acrylates (or methacrylates) are bound together with a chain having an aromatic group and an ether bond; and polyester diacrylate compounds such as MANDA (from Nippon Kayaku Co., Ltd.)

Specific examples of polyfunctional cross-linking agents include, but are not limited to, pentaerythritol triacrylate, trimethylolethane triacrylate, trimethylolpropane triacrylate, tetramethylolmethane tetraacrylate, oligoester acrylate, pentaerythritol trimethacrylate, trimethylolethane trimethacrylate, trimethylolpropane trimethacrylate, tetramethylolmethane tetramethacrylate, oligoester methacrylate, triacyl cyanurate, and triallyl trimellitate.

The amount of the cross-linking agent is preferably 0.01 to 10 parts by weight based on 100 parts by weight of the monomer. In view of imparting good fixability and hot offset resistance to the resultant toner, aromatic divinyl compounds (particularly divinylbenzene) and diacrylate compounds in which acrylates are bound together with a chain having an aromatic group and an ether bond are preferably used.

Among the above monomers, combinations of monomers which can produce styrene copolymers or styrene-acrylic copolymers are preferably used.

Specific examples of polymerization initiator used for the polymerization of vinyl polymers and copolymers include, but are not limited to, 2,2'-azobisisobutyronitrile, 2,2'-azobis(4-methoxy-2,4-dimethylvaleronitrile), 2,2'-azobis(2,4-dimethylvaleronitrile), 2,2'-azobis(2-methylbutyronitrile), dimethyl-2,2'-azobis isobutyrate, 1,1'-azobis(1-cyclohexanecarbonitrile), 2-(carbamoylazo)-isobutyronitrile, 2,2'-azobis(2,4,4-trimethylpentane), 2-phenylazo-2',4'-dimethyl-4'-methoxyvaleronitrile, 2,2'-azobis(2-methylpropane), ketone peroxides (e.g., methyl ethyl ketone peroxide, acetylacetone peroxide, cyclohexanone peroxide), 2,2-bis(tert-butylperoxy)butane, tert-butyl hydroperoxide, cumene hydroperoxide, 1,1,3,3-tetramethylbutyl hydroperoxide, di-tert-butyl peroxide, tert-butylcumyl peroxide, di-cumyl peroxide, α-(tert-butylperoxy)isopropylbenzene, isobutyl peroxide, octanoyl peroxide, decanoyl peroxide, lauroyl peroxide, 3,5,5-trimethylhexanoyl peroxide, benzoyl peroxide, m-tolyl peroxide, di-isopropylperoxy dicarbonate, di-2-ethylhexylperoxy dicarbonate, di-n-propylperoxy dicarbonate, di-2-ethoxyethylperoxy carbonate, diethoxyisopropylperoxy dicarbonate, di(3-methyl-3-methoxybutyl)peroxy carbonate, acetylcyclohexylsulfonyl peroxide, tert-butylperoxy acetate, ter-butylperoxy isobutylate, tert-butylperoxy-2-ethylhexanoate, tert-butylperoxy laurate, tert-butyloxy benzoate, tert-butylperoxy isopropyl carbonate, di-tert-butylperoxy isophthalate, tert-butylperoxy allyl carbonate, isoamylperoxy-2-ethylhexanoate, di-tert-butylperoxy hexahydroterephthalate, and tert-butylperoxy azelate.

When the binder resin is a styrene-acrylic resin, the THF-soluble components of the styrene-acrylic resin preferably has a molecular weight distribution such that at least one peak is present in each of a number average molecular weight range of from 3,000 to 50,000 and that of not less than 100,000, determined by GPC. In this case, the resultant toner has good fixability, offset resistance, and preservability. A binder resin including THF-soluble components having a molecular weight of not greater than 100,000 in an amount of from 50 to 90% is preferably used. A binder resin having a molecular weight distribution such that a main peak is present in a molecular weight range of from 5,000 to 30,000 is more preferably used. A binder resin having a molecular weight distribution such that a main peak is present in a molecular weight range of from 5,000 to 20,000 is much more preferably used.

When the binder resin is a vinyl polymer such as a styrene-acrylic resin, the resin preferably has an acid value of from 0.1 to 100 mgKOH/g, more preferably from 0.1 to 70 mgKOH/g, and much more preferably from 0.1 to 50 mgKOH/g.

Specific examples of alcohol monomers for preparing the polyester resin include, but are not limited to, diols such as ethylene glycol, propylene glycol, 1,3-bitanediol, 1,4-butanediol, 2,3-butanediol, diethylene glycol, triethylene glycol, 1,5-pentanediol, 1,6-hexanediol, neopentyl glycol, 2-ethyl-1,3-hexanediol, and hydrogenated bisphenol A and bisphenol A to which a cyclic ether such as ethylene oxide and propylene oxide is polymerized.

In order that the polyester resin has a cross-linked structure, polyols having 3 or more valences are preferably used. Specific examples of the polyols having 3 or more valences include, but are not limited to, sorbitol, 1,2,3,6-hexanetetrol, 1,4-sorbitan, pentaerythritol, dipentaerythritol, tripentaerythritol, 1,2,4-butanetriol, 1,2,5-pentatriol, glycerol, 2-methylpropanetriol, 2-methyl-1,2,4-butanetriol, trimethylolethane, trimethylolpropane, and 1,3,5-trihydroxybenzene.

Specific examples of acid monomers for preparing the polyester resin include, but are not limited to, benzene dicarboxylic acids (e.g., phthalic acid, isophthalic acid, terephthalic acid) and anhydrides thereof; alkyl dicarboxylic acids (e.g., succinic acid, adipic acid, sebacic acid, azelaic acid) and anhydrides thereof; unsaturated dibasic acids (e.g., maleic acid, citraconic acid, itaconic acid, alkenylsuccinic acid, fumaric acid, mesaconic acid); and unsaturated dibasic acid anhydrides (e.g., maleic acid anhydride, citraconic acid anhydride, itaconic acid anhydride, alkenylsuccinic acid anhydride).

Polycarboxylic acids having 3 or more valences can also be used. Specific examples of the polycarboxylic acids having 3 or more valences include, but are not limited to, trimellitic acid, pyromellitic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, tetra(methylenecarboxyl)methane, 1,2,7,8-octanetetracarboxylic acid, and anhydrides and partial lower alkyl esters thereof.

When the binder resin is a polyester resin, the THF-soluble components of the polyester resin preferably have a molecular weight distribution such that at least one peak is present in a number average molecular weight range of from 3,000 to 50,000, determined by GPC. In this case, the resultant toner has good fixability and offset resistance. A binder resin including THF-soluble components having a molecular weight of not greater than 100,000 in an amount of from 60 to 100% is preferably used. A binder resin having a molecular weight distribution such that at least one peak is present in a molecular weight range of from 5,000 to 20,000 is more preferably used.

When the binder resin is a polyester resin, the resin preferably has an acid value of from 0.1 to 100 mgKOH/g, more preferably from 0.1 to 70 mgKOH/g, and much more preferably from 0.1 to 50 mgKOH/g.

The vinyl polymer and/or polyester resin used for the toner production may include a monomer unit capable of reacting with both the vinyl polymer and the polyester resin. Specific examples of the monomers for preparing the polyester resin and capable of reacting with the vinyl resin include, but are not limited to, unsaturated dicarboxylic acids (e.g., phthalic acid, maleic acid, citraconic acid, itaconic acid) and anhydrides thereof. Specific examples of the monomers for preparing the vinyl polymer and capable of reacting with the polyester resin include, but are not limited to, monomers having carboxyl group or hydroxy group, acrylates, and methacrylates.

When the binder resin includes the polyester resin and the vinyl polymer in combination with another resin, the binder resin preferably includes resins having an acid value of from 0.1 to 50 mgKOH/g in an amount of not less than 60%.

In this disclosure, the acid value of a binder resin of a toner is determined by the following method according to JIS K-0070.

In order to prepare a sample, toner components except the binder resin are previously removed from the toner. Alternatively, if the toner is directly used as a sample, the acid value and weight of the toner components except the binder resin (such as a colorant and a magnetic material) are previously measured, and then the acid value of the binder resin is calculated.

(1) 0.5 to 2.0 g of a pulverized sample is precisely weighed;
(2) the sample is dissolved in 150 ml of a mixture of toluene and ethanol, mixing at a volume ratio of 4/1, in a 300 ml beaker;
(3) the mixture prepared above and the blank each are titrated with a 0.1 mol/l ethanol solution of KOH using a potentiometric titrator; and
(4) the acid value of the sample is calculated from the following equation:

$$AV=[(S-B)\times f\times 5.61]/W$$

wherein AV (mgKOH/g) represents an acid value, S (ml) represents the amount of the ethanol solution of KOH used for the titration of the sample, B (ml) represents the amount of the ethanol solution of KOH used for the titration of the blank, f represents the factor of KOH, and W (g) represents the weight of the binder resin included in the sample.

Each of the binder resin and the toner including the binder resin preferably has a glass transition temperature (Tg) of from 35 to 80° C., and more preferably from 40 to 75° C., from the viewpoint of enhancing preservability of the toner. When the Tg is too small, the toner tends to deteriorate under high temperature atmosphere and cause offset when fixed. When the Tg is too large, fixability of the toner deteriorates.

As the magnetic materials for use in the toner disclosed herein, the following compounds can be used: (1) magnetic iron oxides (e.g., magnetite, maghemite, ferrite) and iron oxides including other metal oxides; (2) metals (e.g., iron, cobalt, nickel) and metal alloys of the above metals with aluminum, cobalt, copper, lead, magnesium, tin, zinc, antimony, beryllium, bismuth, cadmium, calcium, manganese, selenium, titanium, tungsten, vanadium, etc.; and (3) mixtures thereof.

Specific examples of the magnetic materials include, but are not limited to, $Fe_3O_4$, $\gamma$-$Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, iron powder, cobalt powder, and nickel powder. These can be used alone or in combination. Among these, powders of $Fe_3O_4$ and $\gamma$-$Fe_2O_3$ are preferably used.

In addition, magnetic iron oxides (e.g., magnetite, maghemite, ferrite) containing a dissimilar element and mixtures thereof can also be used. Specific examples of the dissimilar elements include, but are not limited to, lithium, beryllium, boron, magnesium, aluminum, silicon, phosphorus, germanium, zirconium, tin, sulfur, calcium, scandium, titanium, vanadium, chromium, manganese, cobalt, nickel, copper, zinc, and gallium. Among these, magnesium, aluminum, silicon, phosphorus, and zirconium are preferably used. The dissimilar element may be incorporated into the crystal lattice of an iron oxide; the oxide thereof may be incorporated into an iron oxide; or the oxide or hydroxide thereof may be present at the surface of an iron oxide. However, it is preferable that the oxide of the dissimilar element is incorporated into an iron oxide.

The dissimilar element is incorporated into a magnetic iron oxide by mixing a salt of the dissimilar element and the magnetic iron oxide and controlling the pH. The dissimilar element is deposited out on the surface of a magnetic iron oxide by adding a salt of the dissimilar element and controlling the pH.

The toner preferably includes the magnetic material in an amount of from 10 to 200 parts by weight, and more preferably from 20 to 150 parts by weight, based on 100 parts by weight of the binder resin. The magnetic material preferably has a number average particle diameter of from 0.1 to 2 μm, and more preferably from 0.1 to 0.5 μm. The number average particle diameter can be determined from a magnified photographic image obtained by a transmission electron microscope using a digitizer.

The magnetic material preferably has a coercive force of from 20 to 150 oersted, a saturation magnetization of from 50 to 200 emu/g, and a residual magnetization of from 2 to 20 emu/g, when 10K oersted of magnetic field is applied.

The magnetic material can also be used as a colorant.

(Colorant)

Specific examples of the colorants for use in the toner disclosed herein include any known dyes and pigments such as carbon black, Nigrosine dyes, black iron oxide, NAPHTHOL YELLOW S, HANSA YELLOW (10G, 5G and G), Cadmium Yellow, yellow iron oxide, loess, chrome yellow, Titan Yellow, polyazo yellow, Oil Yellow, HANSA YELLOW (GR, A, RN and R), Pigment Yellow L, BENZIDINE YELLOW (G and GR), PERMANENT YELLOW (NCG), VULCAN FAST YELLOW (5G and R), Tartrazine Lake, Quinoline Yellow Lake, ANTHRAZANE YELLOW BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, PERMANENT RED (F2R, F4R, FRL, FRLL and F4RH), Fast Scarlet VD, VULCAN FAST RUBINE B, Brilliant Scarlet G, LITHOL RUBINE GX, Permanent Red F5R, Brilliant Carmine 6B, Pigment Scarlet 3B, Bordeaux 5B, Toluidine Maroon, PERMANENT BORDEAUX F2K, HELIO BORDEAUX BL, Bordeaux 10B, BON MAROON LIGHT, BON MAROON MEDIUM, Eosin Lake, Rhodamine Lake B, Rhodamine Lake Y, Alizarine Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, INDANTHRENE BLUE (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone, etc. These materials can be used alone or in combination. The toner preferably includes a colorant in an amount of from 1 to 15% by weight, and more preferably from 3 to 10% by weight.

The colorant for use in the toner disclosed herein can be combined with a resin to be used as a master batch. Specific examples of the resin for use in the master batch include, but are not limited to, the above-mentioned polyester-based resins, styrene polymers and substituted styrene polymers (e.g., polystyrenes, poly-p-chlorostyrenes, polyvinyltoluenes), styrene copolymers (e.g., styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloro methacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, styrene-maleic acid ester copolymers), polymethyl methacrylates, polybutyl methacrylates, polyvinyl chlorides, polyvinyl acetates, polyethylenes, polypropylenes, polyesters, epoxy resins, epoxy polyol resins, polyurethanes, polyamides, polyvinyl butyrals, polyacrylic acids, rosins, modified rosins, terpene resins, aliphatic or alicyclic hydrocarbon resins, aromatic petroleum resins, chlorinated paraffins, paraffin waxes, etc. These resins can be used alone or in combination.

The master batches can be prepared by mixing one or more of the resins as mentioned above and the colorant as mentioned above and kneading the mixture while applying a high shearing force thereto. In this case, an organic solvent can be added to increase the interaction between the colorant and the resin. In addition, a flushing method in which an aqueous paste including a colorant and water is mixed with a resin dissolved in an organic solvent and kneaded so that the colorant is transferred to the resin side (i.e., the oil phase), and then the organic solvent (and water, if desired) is removed, can be preferably used because the resultant wet cake can be used as it is without being dried. When performing the mixing and kneading process, dispersing devices capable of applying a high shearing force such as three roll mills can be preferably used.

The toner preferably includes the master batch in an amount of from 0.1 to 20 parts by weight based on 100 parts by weight of the binder resin.

The resin used for the master batch preferably has an acid value of not greater than 30 mgKOH/g and an amine value of from 1 to 100, and more preferably an acid value of not greater than 20 mgKOH/g and an amine value of from 10 to 50. When the acid value is too large, chargeability of the toner deteriorates under high humidity conditions and dispersibility of the colorant deteriorates. When the amine value is too small or large, dispersibility of the colorant deteriorates. The acid value and the amine vale can be measured according to JIS K-0070 and JIS K-7237, respectively.

A colorant dispersing agent can be used in combination with the colorant. The colorant dispersing agent preferably has high compatibility with the binder resin in order to well disperse the colorant. Specific examples of useable commercially available colorant dispersing agents include, but are not limited to, AJISPER® PB-821 and PB-822 (from Ajinomoto-Fine-Techno Co., Inc.), DISPERBYK®-2001 (from BYK-Chemie Gmbh), and EFKA® 4010 (from EFKA Additives BV).

The colorant dispersing agent preferably has a weight average molecular weight, which is a local maximum value of the main peak observed in the molecular weight distribution measured by GPC (gel permeation chromatography) and converted from the molecular weight of styrene, of from 500 to 100,000, more preferably from 3,000 from 100,000, from the viewpoint of enhancing dispersibility of the colorant. In particular, the average molecular weight is preferably from 5,000 to 50,000, and more preferably from 5,000 to 30,000. When the average molecular weight is too small, the dispersing agent has too high a polarity, and therefore dispersibility of the colorant deteriorates. When the average molecular weight is too large, the dispersing agent has too high an affinity for the solvent, and therefore dispersibility of the colorant deteriorates.

The toner preferably includes the colorant dispersing agent in an amount of from 1 to 200 parts by weight, and more preferably from 5 to 80 parts by weight, based on 100 parts by weight of the colorant. When the amount is too small (e.g., less than 1 part by weight), the colorant cannot be well dispersed. When the amount is too large (e.g., more than 200 parts by weight), chargeability of the resultant toner deteriorates.

(Carrier)

The toner disclosed herein can be mixed with a carrier so as to be used for a two-component developer. As the carrier, typical ferrite, magnetite, and a carrier covered with a resin (hereinafter referred to as resin-covered carrier) can be used.

The resin-covered carrier comprises a core and a covering material (i.e., resin) which covers the surface of the core.

Specific examples of the resins used for the covering material include, but are not limited to, styrene-acrylic resins (e.g., styrene-acrylate copolymer, styrene-methacrylate copolymer), acrylic resins (e.g., acrylate copolymer, methacrylate copolymer), fluorocarbon resins (e.g., polytetrafluoroethylene, monochlorotrifluoroethylene polymer, polyvinylidene fluoride), silicone resin, polyester resin, polyamide resin, polyvinyl butyral, aminoacrylate resin, ionomer resin, polyphenylene sulfide resin. These can be used alone or in combination.

A core in which a magnetic powder is dispersed in a resin can also be used.

Specific examples of methods for covering the surface of a core with a covering material (i.e., resin) include a method in which a solution or suspension of the resin is coated on the core, and a method in which the powder resin is mixed with the resin.

The resin-covered carrier preferably includes the covering material in an amount of from 0.01 to 5% by weight, and more preferably from 0.1 to 1% by weight.

As a covering material, mixtures of two or more compounds can also be used. For example, (1) 100 parts by weight of a titanium oxides treated with 12 parts by weight of a mixture of dimethyldichlorosilane and dimethyl silicone oil (mixing weight ratio is 1/5) and (2) 100 parts by weight of a silica treated with 20 parts by weight of a mixture of dimethyldichlorosilane and dimethyl silicone oil (mixing weight ratio is 1/5) can be used.

Among the above-mentioned resins, styrene-methyl methacrylate copolymer, mixtures of a fluorocarbon resin and a styrene copolymer, and silicone resin are preferably used, and silicone resin are more preferably used.

Specific examples of the mixtures of a fluorocarbon resin and a styrene copolymer include, but are not limited to, a mixture of polyvinylidene fluoride and styrene/methyl methacrylate copolymer; a mixture of polytetrafluoroethylene and styrene/methyl methacrylate copolymer; and a mixture of vinylidene fluoride/tetrafluoroethylene copolymer (copolymerization ratio is from 10:90 to 90:10 by weight), styrene/2-ethylhexyl acrylate copolymer (copolymerization ratio is from 10:90 to 90:10 by weight), and styrene/2-ethylhexyl acrylate/methyl methacrylate copolymer (copolymerization ratio is (20 to 60):(5 to 30):(10 to 50) by weight).

Specific examples of the silicone resins include, but are not limited to, a silicone resin containing nitrogen and a modified silicone resin formed by reacting a silane-coupling agent containing nitrogen with a silicone resin.

Magnetic materials used for the core include, but are not limited to, oxides such as ferrite, iron excess ferrite, magnetite, and γ-iron oxide; metals such as iron, cobalt, an nickel and alloys thereof.

Specific examples of the elements included in these magnetic materials include, but are not limited to, iron, cobalt, nickel, aluminum, copper, lead, magnesium, tin, zinc, antimony, beryllium, bismuth, calcium, manganese, selenium, titanium, tungsten, and vanadium. Among these, Cu—Zn—Fe ferrites including copper, zinc, and iron as main components and Mn—Mg—Fe ferrites including manganese, magnesium, and iron as main components are preferably used.

The carrier preferably has a resistivity of from $10^6$ to $10^{10}$ Ω·cm by controlling the roughness and of the surface and the amount of the covering resin.

The carrier typically has a particle diameter of from 4 to 200 μm, preferably from 10 to 150 μm, and more preferably from 20 to 100 μm. The resin-covered carrier preferably has a 50% particle diameter of from 20 to 70 μm.

The two-component developer preferably includes the toner disclosed herein in an amount of from 1 to 200 parts by weight, and more preferably 2 to 50 parts by weight, based on 100 parts by weight of the carrier.

(Wax)

The toner disclosed herein may include a wax in addition to a binder resin and a colorant.

Any known waxes can be used for the toner disclosed herein. Specific examples of the waxes include, but are not limited to, aliphatic hydrocarbon waxes (e.g., low-molecular-weight polyethylene, low-molecular-weight polypropylene, polyolefin wax, microcrystalline wax, paraffin wax, SASOL wax), oxides of aliphatic hydrocarbon waxes (e.g., polyethylene oxide wax) and copolymers thereof, plant waxes (e.g., candelilla wax, carnauba wax, haze wax, jojoba wax), animal waxes (e.g., bees wax, lanoline, spermaceti wax), mineral waxes (e.g., ozokerite, ceresin, petrolatum), waxes including fatty acid esters (e.g., montanic acid ester wax, castor wax) as a main component, and partially or completely deacidified fatty acid esters (e.g., deacidified carnauba wax).

In addition, the following compounds can also be used: saturated straight-chain fatty acids (e.g., palmitic acid, stearic acid, montanic acid, and other straight-chain alkyl carboxylic acid), unsaturated fatty acids (e.g., brassidic acid, eleostearic acid, parinaric acid), saturated alcohols (e.g., stearyl alcohol, behenyl alcohol, carnaubyl alcohol, ceryl alcohol, melissyl alcohol, and other long-chain alkyl alcohol), polyols (e.g., sorbitol), fatty acid amides (e.g., linoleic acid amide, olefin acid amide, lauric acid amide), saturated fatty acid bisamides (e.g., methylenebis capric acid amide, ethylenebis lauric acid amide, hexamethylenebis capric acid amide), unsaturated fatty acid amides (e.g., ethylenebis oleic acid amide, hexamethylenebis oleic acid amide, N,N'-dioleyl adipic acid amide, N,N'-dioleyl sebacic acid amide), aromatic biamides (e.g., m-xylenebis stearic acid amide, N,N-distearyl isophthalic acid amide), metal salts of fatty acids (e.g., calcium stearate, calcium laurate, zinc stearate, magnesium stearate), alophatic hydrocarbon waxes to which a vinyl monomer such as styrene and an acrylic acid is grafted, partial ester compounds between a fatty acid such as behenic acid monoglyceride and a polyol, and methyl ester compounds having a hydroxyl group obtained by hydrogenating plant fats.

In particular, the following compounds are preferably used: a polyolefin obtained by radical polymerizing an olefin under high pressure; a polyolefin obtained by purifying low-molecular-weight by-products of a polymerization reaction of a high-molecular-weight polyolefin; a polyolefin polymerized under low pressure in the presence of a Ziegler catalyst or a metallocene catalyst; a polyolefin polymerized using radiation, electromagnetic wave, or light; a low-molecular-weight polyolefin obtained by thermally decomposing a high-molecular-weight polyolefin; paraffin wax; microcrystalline wax; Fischer-Tropsch wax; hydrocarbon waxes synthesized with Synthol method, Hydrocoal method, Arge method, and so forth; synthesized hydrocarbon waxes; synthesized waxes including a compound having one carbon atom as a monomer unit; hydrocarbon waxes having a functional group such as hydroxyl group and carboxyl group; mixtures of a hydrocarbon wax and that having a functional group; and these waxes to which a vinyl monomer such as styrene, a maleate, an acrylate, a methacrylate, and a maleic anhydride is grafted.

Among these waxes, carnauba wax, synthesized ester wax, paraffin wax are most preferably used in view of preventing the occurrence of offset.

In addition, these waxes subjected to a press sweating method, a solvent method, a recrystallization method, a vacuum distillation method, a supercritical gas extraction method, or a solution crystallization method, so as to much more narrow the molecular weight distribution thereof are preferably used. Further, low-molecular-weight solid fatty acids, low-molecular-weight solid alcohols, low-molecular-weight solid compounds, and other compounds from which impurities are removed are preferably used.

The wax preferably has a melting point of from 70 to 140° C., and more preferably from 70 to 120° C., so that the resultant toner has a good balance of toner blocking resistance and offset resistance. When the melting point is too small (i.e., below 70° C.), toner blocking resistance deteriorates. When the melting point is too high (i.e., above 140° C.), offset resistance deteriorates.

When two or more waxes are used in combination, functions of both plasticizing and releasing simultaneously appear.

As a wax having a function of plasticizing, for example, a wax having a low melting point, a wax having a branched structure, and a wax having a polar group can be used.

As a wax having a function of releasing, for example, a wax having a high melting point, a wax having a straight-chain structure, and a nonpolar wax having no functional group can be used.

For example, a combination of two waxes having the difference in melting point of from 10 to 100° C., and a combination of a polyolefin and a grafted polyolefin are preferable.

When two waxes having a similar structure are used in combination, a wax having relatively lower melting point exerts a function of plasticizing and the other wax having a relatively higher lower melting point exerts a function of releasing. When the difference in melting point between the two waxes is from 10 to 100° C., these functions are efficiently separately expressed. When the difference is too small, these functions are not efficiently separately expressed. When the difference is too large, each of the functions is hardly enhanced by their interaction. It is preferable that one wax has a melting point of from 70 to 120° C., more preferably from 70 to 100° C.

As mentioned above, a wax having a branched structure, a wax having a polar group such as a functional group, and a wax modified with a component different from the main component of the wax relatively exerts a function of plasticizing. On the other hand, a wax having a straight-chain structure, a nonpolar wax having no functional group, and an unmodified wax relatively exerts a function of releasing. Specific preferred examples of combinations of waxes include, but are not limited to, a combination of a polyethylene homopolymer or copolymer including ethylene as a main component, and a polyolefin homopolymer or copolymer including an olefin other than ethylene as a main component; a combination of a polyolefin and a graft-modified polyolefin; a combination of a hydrocarbon wax and one member selected from an alcohol wax, a fatty acid wax, and an ester wax, and; a combination of a Fischer-Tropsch wax or a polyolefin wax, and a paraffin wax or a microcrystalline wax; a combination of a Fischer-Tropsch wax and a polyolefin wax; a combination of a paraffin wax and a microcrystalline wax; and a combination of a hydrocarbon wax and one member selected from a carnauba wax, a candelilla wax, a rice wax, and a montan wax.

The toner preferably has a maximum endothermic peak in a temperature range of from 70 to 110° C. of the endothermic curve measured by DSC (differential scanning calorimetry). In this case, the toner has a good balance of preservability and fixability.

The toner preferably includes the wax in an amount of from 0.2 to 20 parts by weight, more preferably from 0.5 to 10 parts by weight, based on 100 parts by weight of the binder resin.

In this disclosure, the melting point of a wax is defined as a temperature in which the maximum endothermic peak is observed in an endothermic curve measured by DSC.

As a DSC measurement instrument, a high-precision inner-heat power-compensation differential scanning calorimeter is preferably used. The measurement is performed according to ASTM D3418-82. The endothermic curve is obtained by heating a sample at a temperature increasing rate of 10° C./min, after once heated and cooled the sample.

(Fluidity Improving Agent)

The toner disclosed herein may include a fluidity improving agent, which enables the resultant toner to easily fluidize by being added to the surface of the toner.

Specific examples of the fluidity improving agents include, but are not limited to, fine powders of fluorocarbon resins such as carbon black, vinylidene fluoride, and polytetrafluoroethylene; fine powders of silica prepared by a wet process or a dry process, titanium oxide, and alumina; and these silica, titanium oxide, and alumina surface-treated with a silane-coupling agent, a titanium-coupling agent, or a silicone oil. Among these, fine powders of silica, titanium oxide, and alumina are preferably used, and the silica surface-treated with a silane-coupling agent or a silicone oil is more preferably used.

The fluidity improving agent preferably has an average primary particle diameter of from 0.001 to 2 μm, and more preferably from 0.002 to 0.2 μm.

A fine powder of silica is prepared by a vapor phase oxidization of a halogenated silicon compound, and typically called a dry process silica or a fumed silica.

Specific examples of useable commercially available fine powders of silica prepared by a vapor phase oxidization of a halogenated silicon compound include, but are not limited to, AEROSIL® 130, 300, 380, TT600, MOX170, MOX80, and COK84 (from Nippon Aerosil Co., Ltd.), CAB-O-SIL® M-5, MS-7, MS-75, HS-5, and EH-5 (from Cabot Corporation), WACKER HDK® N20, V15, N20E, T30, and T40 (from Wacker Chemie Gmbh), Dow Corning® Fine Silica (from Dow Corning Corporation), and FRANSIL (from Fransol Co.).

A hydrophobized fine powder of silica prepared by a vapor phase oxidization of a halogenated silicon compound is more preferably used. The hydrophobized silica preferably has a hydrophobized degree of from 30 to 80%, measured by a methanol titration test. The hydrophobic property is imparted to a silica when an organic silicon compound is reacted with or physically adhered to the silica. A hydrophobizing method in which a fine powder of silica prepared by a vapor phase oxidization of a halogenated silicon compound is treated with an organic silicon compound is preferable.

Specific examples of the organic silicon compounds include, but are not limited to, hydroxypropyltrimethoxysilane, phenyltrimethoxysilane, n-hexadecyltrimethoxysilane, n-octadecyltrimethoxysilane, vinyltrimethoxysilane, vinyltriethoxysilane, vinyltriacetoxysilane, dimethylvinylchlorosilane, divinylchlorosilane, γ-methacryloxypropyltrimethoxysilane, hexamethyldisilazane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethylethoxysilane, trimethylethoxysilane, trimethylmethoxysilane, methyltriethoxysilane, isobutyltrimethoxysilane, dimethyldimethoxysilane, diphenyldiethoxysilane, hexamethyldisiloxane, 1,3-divinyltetramethyldisiloxane, 1,3-diphenyltetramethyldisiloxane, dimethylpolysiloxane having 2 to 12 siloxane units per molecule and 0 to 1 hydroxyl group bound to Si in the end siloxane units, and silicone oils such as dimethyl silicone oil. These can be used alone or in combination.

The fluidity improving agent preferably has a number average particle diameter of from 5 to 100 nm, and more preferably from 5 to 50 nm.

The fluidity improving agent preferably has a specific surface area of not less than 30 $m^2/g$, and more preferably from 60 to 400 $m^2/g$, measured by nitrogen adsorption BET method.

The surface-treated fluidity improving agent preferably has a specific surface area of not less than 20 $m^2/g$, and more preferably from 40 to 300 $m^2/g$, measured by nitrogen adsorption BET method.

The toner preferably includes the fluidity improving agent in an amount of from 0.03 to 8 parts by weight based on 100 parts by weight of the toner.

To the toner disclosed herein, other additives can be suitably added in accordance with the necessity, aiming at protecting latent electrostatic image bearing member and carrier, improving cleaning ability, controlling thermal property, electric property, and physical property, controlling resistance property, controlling softening point, and improving fixing rate. Examples of the other additives include various metal soaps, fluoride surfactants, dioctyl phthalate; conductivity imparting agents such as tin oxides, zinc oxides, carbon black, and antimony oxides; and inorganic fine powders such as titanium oxides, aluminum oxides, and aluminas. Each of these inorganic fine powders may be hydrophobized in accordance with the necessity. In addition, it is possible to use a small amount of lubricant such as polytetrafluoroethylene, zinc stearate, and polyfluorovinylidene; and abrasive such as cesium oxides, silicon carbides, and strontium titanate; and caking protecting agents. Besides, white fine particles and black fine particles having a reverse polarity from the polarity of toner particles can be further added as developing property improving agent.

It is also preferable that each of these additives is treated with treatment agents such as silicone varnish, various types of modified-silicone varnish, silicone oil, various types of silicone oil, silane coupling agent, silane coupling agent having a functional group, and other organic silicon compounds or other types of treatment agents, aiming at controlling the charge amount of the toner.

In the course of preparation of a developer, inorganic fine particles such as the above-noted hydrophobized silica fine powders may be mixed and added in order to enhance flowability, storage stability, developing property, and transferability of the developer.

As for the mixing of external additives, a generally used mixer for powder is used in mixing external additives, however, a mixer equipped with a jacket or the like and capable of controlling the inside temperature thereof is preferable. To change history of load to be applied to the external additives, the external additives may be added in the course of mixing or by degrees. Of course, rotation speed of a mixer, rolling speed, mixing time, temperature, or the like may be altered. A heavy load may be given first, and then a relatively light load may be given to the mixer or may be conversely.

Examples of usable mixing equipment include V-shaped mixer, rocking mixer, Ledige mixer, Nauter mixer, and HENSCHEL MIXER.

The method for controlling the shape of the obtained toner is not particularly limited, may be suitably selected in accordance with the intended use, and examples of the method include a method in which a toner composition containing a binder resin and a colorant or the like are fused, kneaded, and finely pulverized, and the pulverized toner is mechanically controlled and shaped using hybritizer and MECHANOFUSION; so-call spray dry method in which the toner composition is dissolved or dispersed in a toner-binder soluble solvent, and the solution or the dispersion is subjected to a solvent removal treatment using a spray drying device to thereby obtain a spherical toner; and a method of which a toner is made to be formed in spherical shape by heating the toner composition in an aqueous medium.

For the external additives, inorganic fine particles are preferably used. Examples of the inorganic fine particles include silicas, aluminas, titanium oxides, barium titanates, magnesium titanates, calcium titanates, strontium titanates, zinc oxides, tin oxides, silica sand, clay, mica, wallastonite, silious earth, chromium oxides, ceric oxides, colcothar, antimony trioxides, magnesium oxides, zirconium oxides, barium sulfates, barium carbonates, calcium carbonates, silicon carbides, and silicon nitrides.

The primary particle diameter of the inorganic fine particles is preferably 5 mμ to 2 μm, and more preferable 5 mμ to 500 μm.

The specific surface are of the inorganic fine particles based on the BET method is preferably 20 $m^2/g$ to 500 $m^2/g$.

The usage ratio of the inorganic fine particles relative to the toner is preferably 0.01% by mass to 5% by mass, and more preferably 0.01% by mass to 2.0% by mass.

Besides, for the external additives, there are high-molecule fine particles such as polystyrenes obtained by soap-free emulsification polymerization, suspension polymerization, and dispersion polymerization; copolymers of methacrylic acid ester and acrylic acid ester; and polycondensed fine particles such as silicone, benzoguanamine, and nylon; and polymer particles using a thermosetting resin.

Deterioration of these external additives can be prevented even under high humidity conditions by improving the hydrophobicity thereof using a surface treatment agent.

Preferred examples of the surface treatment agent include silane coupling agents, sililation reagents, silane coupling agents having a fluorinated alkyl group, organic titanate coupling agents, aluminum coupling agents, silicone oils, and modified silicone oils.

Besides, examples of cleaning ability improving agents for removing developer remaining on a latent electrostatic image bearing member or a primary transferring medium after transferring include fatty acid metal slats such as zinc stearate, calcium stearate, and stearic acid; and polymer fine particles, for example, produced by a soap-free emulsion polymerization method such as polymethyl methacrylate fine particles, and polystyrene fine particles. Polymer fine particles preferably have a relatively narrow particle size distribution and a weight average particle diameter of 0.01 μm to 1 μm.

In the developing process used with the toner disclosed herein, a latent electrostatic image bearing member used in conventional electrophotography can be used. For example, organic latent electrostatic image bearing members, amorphous silica latent electrostatic image bearing members, selenium latent electrostatic image bearing members, zinc oxide latent electrostatic image bearing members can be suitably used.

Next, the toner constituent liquid to be solidified by cooling in the granulator (granulation process) will be explained.

The toner constituent liquid heated and melted, and cooled and solidified preferably includes the following materials melted to prepare a solution having low viscosity as a main component.

Specific examples thereof include monoamide, bisamide, tetraamide, esteramide, polyester, polyvinylacetate, acrylic and methacrylic acid polymers, styrene polymers, ethylenevinylacetate copolymers, polyketone, silicone, coumarone, fatty acid esters, triglyceride, natural resins, natural and synthetic waxes, etc. These can be used alone or in combination.

Specific examples of the polyamide resin include Versamide 711, Versamide 725, Versamide 930, Versamide 940, Versalon 1117, Versalon 1138 and Versalon 1300 from Henkel Corp.; Tohmide 391, Tohmide 393, Tohmide 394, Tohmide 395, Tohmide 397, Tohmide 509, Tohmide 535, Tohmide 558, Tohmide 560, Tohmide 1310, Tohmide 1396, Tohmide 90 and Tohmide 92 from Fuji Kasei Kogyo Co., ltd.; polyester include KTR2150 from Kao Corp.; polyvinylacetate include AC401, AC540 and AC580 from Allied Chemical International Co., Ltd.; silicone include silicone SH6018 from Dow Corning Toray Co., Ltd., Silicone KR215, KR216 and KR220 from Shin-Etsu Chemical Co., Ltd.; and coumarone include Escron G-90 from Nippon Steel Chemical Co., Ltd.

Specific examples of the fatty acid include a stearic acid, an arachidic acid, a behenic acid, a lignoceric acid, a cerotic acid, a montanic acid, melissic acid and their esters. These can be used alone or in combination.

Specific examples of the fatty acid amide include lauric amide, stearic amide, oleic amide, erucic amide, ricinoleic amide, amide of stearic acid, palmitic amide, behenic amide and brassidic amide; and N-substituted fatty acid amide include N,N'-2-hydroxystearic amide, N,N'-ethylenebisoleic amide, N,N'-xylenebisstearic amide, monomethylolstearic amide, N-oleylstearic amide, N-stearylstearic amide, N-oleylpalmitic amide, N-stearylerucic amide, N,N'-dioleyladipic amide, N,N'-dioleylsebacic amide, N,N'-distearylisophthalic amide and 2-stearamideethylstearate. These can be used alone or in combination.

Specific examples of the fatty acid esters preferably include monovalent or polyvalent alcohol fatty acid esters such as sorbitanmonopalmitate, sorbitanmonostearate, sorbitanmonobehenate, polyethyleneglycolmonostearate, polyethyleneglycoldistearate, propyleneglycolmonostearate, ethyleneglycoldistearate, etc.

Specific examples of marketed products thereof include Leodol SP-S10, Leodol SP-S30, Leodol SA10, Emasol P-10, Emasol S-10, Emasol S-20, Emasol B, Leodol Super SP-S10, Emanorn 3199, Emanorn 3299 and Exepearl PE-MS from Kao Corp., etc.

Specific examples of the fatty acid esters preferably include those of glycerin such as monoglyceridestearate, palmitinmonoglyceride, monoglycerideoleate, monoglyceridebehenate, etc. Specific examples of marketed products thereof include Leodol MS-50, Leodol MS-60, Leodol MS-165, Leodol MO-60 and Exepearl G-MB from Kao Corp.; Deodorized Carnauba Wax No. 1 and Refined Candelilla Wax No. 1 from Noda Wax Co., Ltd.; Synchrowax ERL-C and Synchrowax HR-C from Croda International P1c; and KF2 from Kawaken Fine Chemicals Co., Ltd. Specialty ester waxes such as Exepearl DS-C2 from Kao Corp.; Kawaslip-L and Kawaslip-R from Kawaken Fine Chemicals Co., Ltd. can also be used. Higher alcohol esters of higher fatty acids such as myricylcerociate, serylcerociate, serylmontanate, myricylpalmitate, myricylstearate, cetylpalmitate and cetylstearate can also be used.

Alkyl groups are present in both fatty acids and alcohols. These fatty acid esters can be used alone or in combination.

The fatty acid esters have low melting viscosities and stable fluidity when melting inks. In addition, having flexibilities higher and surface protections stronger than a carbon-carbon bond, a printed image can be folded. The fatty acid ester preferably has a penetration greater than 1 and high subjection to pressure treatment. Further, the fatty acid preferably has a viscosity less than 30 mPa·s when sprayed.

Typically, the polyamides are broadly classified into aromatic polyamides and dimer acid polyamides, and the dimer acid polyamides are preferably used in the present invention. The dimer acid is most preferably an oleic acid, a linoleic acid or an eleostearic acid. Specific examples of marketed products thereof include Marcomelt 6030, Marcomelt 6065, Marcomelt 6071, Marcomelt 6212, Marcomelt 6217, Marcomelt 6224, Marcomelt 6228, Marcomelt 238, Marcomelt 6239, Marcomelt 6240, Marcomelt 6301, Marcomelt 6900, DPX 335-10, DPX H-415, DPX 335-11, DPX 830, DPX 850, DPX 925, DPX 927, DPX 1160, DPX 1163, DPX 1175, DPX 1196 and DPX 1358 from Henkel Corp.; SYLVAMIDE-5 from Arizona Chemical Co.: and UNIREZ 2224 and UNIREZ 2970 from Union Camp Corp., etc.

Specific examples of the glycerides include rosin ester, lanolin ester, hardened ricinus, partially-hydrogenated ricinus, extremely-hardened soy oil, extremely-hardened canola oil, extremely-hardened vegetable oil, etc. These can be used alone or in combination.

Specific examples of the wax include petroleum-derived waxes such as paraffin wax and microcrystalline wax; plant waxes such as candelilla wax and carnauba wax; polyethylene wax; hardened ricinus; stearic acid; higher fatty acids such as a behenic acid; higher alcohol; ketones such as stearone and laurone; fatty acid ester amides; saturated or unsaturated fatty acid amides; and fatty acid esters. Particularly, the fatty acid ester amides, saturated or unsaturated fatty acid amides and fatty acid esters are preferably used.

These fatty acids, fatty acid amides, glycerides and waxes can be used alone or in combination.

These components can be mixed or dispersed by any known pulverizers or dispersers such as high-speed rotation mills, roller mills, container drive medium mills, medium agitation mills, jet mills, rotation cylinder mills, oscillation ball mills, centrifugal ball mills, colloid mills. Specific examples thereof include a cutter mill, a cage mill, a hammer mill, a centrifugal classification mill, a stamp mill, a fret mill, a centrifugal mill, a ball bearing mill, a ring roll mill, a table mill, a rolling ball mill, a tube mill, a conical mill, a tricone mill, a pot mill, a cascade mill, a centrifugal fluidization mill, an annular mill, a high-speed disperser, an inpera disperser, a gate mixer, a beads mill, a sand mill, a pearl mill, a cobra mill, a pin mill, a molinex mill, an agitation mill, a universal mill, a century mill, a pressure mill, an agitator mill, a two-roll extruder, a two-roll mill, a three-roll mill, a niche mill, a kneader, a mixer, a stone mill, a KD mill, a planetary mill, a high swing mill, a ring mill, an agitation tank agitation mill, an upright flow agitation mill, a ball mill, a paddle mixer, a tower mill, an attritor, a centrimill, a sand grinder, a glen mill, an attrition mill, a planetary mill, n oscillation mill, a flow jet mixer, a scrusher mill, a peg mill, a microfluidizer, a clea mix, a rhino mill, a homogenizer, a bead mill with pin, a horizontal beads mill, a pin mill, a majac mill, etc.

The toner materials are mixed, pulverized and dispersed by the above-mentioned pulverizers or dispersers to prepare a toner constituent liquid. The toner constituent liquid is led into the reservoir 14 while melted and discharged from the holes 15 of the atomizing head 11 to form droplets. Alternatively, the toner constituent liquid prepared by the above-mentioned pulverizers or dispersers is cooled, solidified and crushed, and the crushed toner constituent is heated and melted at the reservoir 14 and discharged from the holes 15 of the atomizing head 11 to form droplets.

Next, a toner constituent liquid including a radiation hardening material, granulated, irradiated and hardened to form a particulate material will be explained.

Specific examples of the radiation-hardening material typically include radiation-sensitive resins or radiation-hardening resins such as cyclized polyisoprene, cyclized polybutadiene, poly(meth)acrylic ester of polyether, cinnamate ester of polyvinylalcohol, novolak resins, glycidylpolymethacrylate, polymethylstyrenechloride, etc.

The radiation-hardening materials are diluted with a solvent or a polymerizable monomer, and a radiation crosslinker or a radiation polymerization initiator is added thereto. Specific examples of the polymerizable monomer include vinyl aromatic monomers such as styrene, α-methylstyrene, vinyltoluene, chlorostyrene and divinylbenzene; acrylic monomers such as (meth)acrylate, methyl(meth)acrylate, n-butyl (meth)acrylate, hydroxyethyl(meth)acrylate, ethyleneglycoldi(meth)acrylate and (meth)acrylonitrile; vinylester monomers such as vinylformate and vinylacetate; halogenated vinyl monomers such as vinylchloride and vinylidenechloride; and diallylphthalate; triallylcyanurate, etc.

These can be used alone or in combination. Styrene, (meth) acrylate ester or divinylbenzene is preferably included in an amount of from 0.05 to 3 parts by weight to prevent offset phenomena while the fixability of the resultant toner is maintained.

Specific examples of the radiation crosslinker or a radiation polymerization initiator include aromatic azide, azide compounds such as trichloromethylazide, halogenated silver, bisimidazole derivatives, cyanine pigments, ketocoumarine pigments, etc. In addition, azo radical polymerization initiators such as azobisisobutylonitrile and azobisvaleronitrile can also be used.

The droplets 31 of the toner constituent liquid including a radiation-hardening material are preferably irradiated by a high-pressure or a low-pressure mercury lamp to be hardened while flowing with ultraviolet having a wavelength up to 480 nm, and more preferably from 250 to 410 nm. An energy on the order of several mJ/cm$^2$ to several J/cm$^2$ is preferably used to irradiate the droplets.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

In Examples 1 through 6 and Comparative Example described below, spray units are prepared in a similar manner with the atomizing heads equipped with different types of thin films. It should be appreciated that the spray unit according to this disclosure may be used to produce liquid droplets other than those of toner material, and the following examples illustrate an application to atomizing non-toner liquid material.

Example 1

A test sample (ethyl acetate) was loaded in the spray unit equipped with a circular thin film similar to that described in FIGS. 11A and 11B. The thin film was 5.0 mm in diameter and 20 μm in peripheral thickness, with a planar center portion 1.5 mm in diameter and 40 μm in thickness. The entire thin film was formed of nickel. The center portion had multiple electroformed holes with 10 μm circular outlets staggered 100 μm apart.

Spraying was performed by vibrating the thin film at 35.7 kHz to determine an amount of displacement along a diameter of the thin film, an area of the thin film in which the holes formed droplets of desired dimensions (hereinafter "effective area"), and a relative dispersion in droplet size distribution. The relative dispersion was represented as a coefficient of variation (CV) obtained by the following equation:

$$CV(\%)=[\text{standard deviation in diameter/mean diameter}]*100$$

Figure 15:
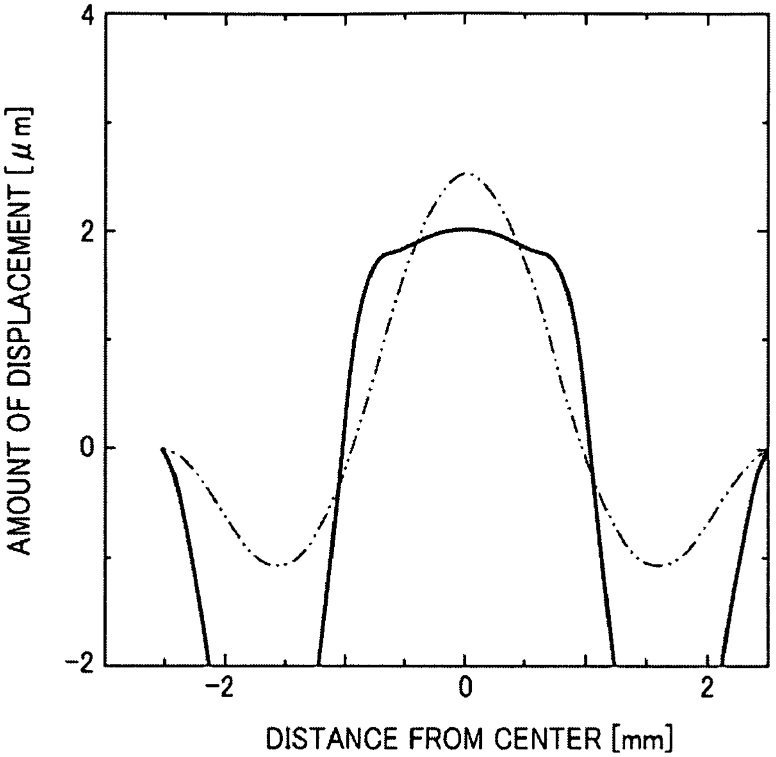
FIG. 15 shows a plot of vibration displacement of a perforated thin film configured according to this disclosure.

FIG. 15 shows a plot of the vibration displacement of the thin film (solid line), where the vibration displacement of a planar 20 μm thick circular membrane (dash-dotted line) is also shown for comparison. As clearly seen from the drawing, the thin film configured according to this disclosure achieves a substantially uniform distribution of vibration displacement over an area around the center. The thin film had an effective area extending 0.7 mm in diameter and the resultant toner showed a CV of 2.5%, indicating good monodispersibility.

Example 2

A test sample (ethyl acetate) was loaded in the spray unit equipped with a circular thin film with varying thickness similar to that described in Example 1, except that the planar center portion was 80 μm in thickness. Spraying was performed by vibrating the thin film at 37.5 kHz.

Example 3

A test sample (ethyl acetate) was loaded in the spray unit equipped with a circular thin film with varying thickness similar to that described in Example 1, except that the planar center portion was 4.0 mm in diameter. Spraying was performed by vibrating the thin film at 48.6 kHz.

Example 4

A test sample (ethyl acetate) was loaded in the spray unit equipped with a circular thin film with varying thickness similar to that described in Example 1, except that the planar center portion was 80 μm in thickness and 4.0 mm in diameter. Spraying was performed by vibrating the thin film at 62.2 kHz.

Example 5

A test sample (ethyl acetate) was loaded in the spray unit equipped with a circular thin film with varying thickness similar to that described in Example 1, except that the planar center portion was 40 μm in thickness and 4.0 mm in diameter, and was formed by combining a 20 μm thick nickel layer and a 20 μm thick stainless steel (SUS304) layer. Spraying was performed by vibrating the thin film at 8.0 kHz.

Example 6

A test sample (ethyl acetate) was loaded in the spray unit equipped with a circular thin film with varying thickness similar to that described in Example 1, except that the planar center portion was 80 μm in thickness and 4.0 mm in diameter, and was formed by combining a 20 μm thick nickel layer and a 60 μm thick stainless steel (SUS304) layer. Spraying was performed by vibrating the thin film at 36.0 kHz.

Comparative Example

A test sample (ethyl acetate) was loaded in the spray unit equipped with a planar circular thin film having multiple holes. The planar thin film was a nickel plate 5.0 mm in diameter and 20 μm in thickness. Spraying was performed by vibrating the thin film at 98 kHz.

Figure 16:
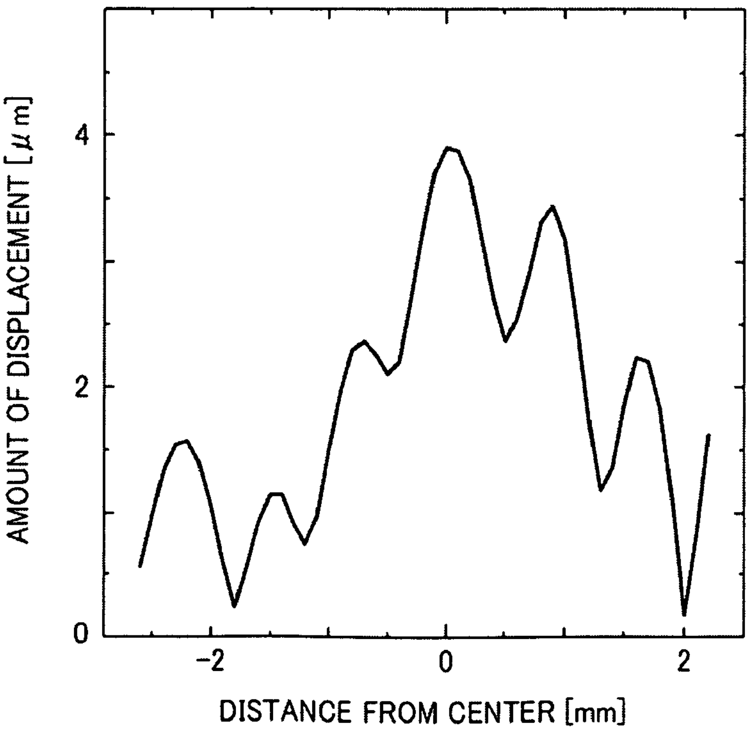
FIG. 16 shows a plot of vibration displacement of a planar perforated thin film.

FIG. 16 shows a plot of the vibration displacement of the planar thin film. The planar thin film was actuated in a vibration mode with several transverse nodes, which increased droplet size variation.

The physical properties of the thin films as well as the frequencies employed and measured results of the evaluation are shown in Table 1 below.

TABLE 1

| | | Ex. 1 | Ex. 2 | Ex. 3 | Ex. 4 | Ex. 5 | Ex. 6 | Comp. Ex. |
|---|---|---|---|---|---|---|---|---|
| Peripheral portion*[1] | Thickness (μm) | 20 | 20 | 20 | 20 | 20 | 20 | 20 |
| | Diameter (mm) | 5.0 | 5.0 | 5.0 | 5.0 | 5.0 | 5.0 | 5.0 |
| | Material | Ni | Ni | Ni | Ni | Ni | Ni | Ni |
| Center portion*[2] | Thickness (μm) | 40 | 80 | 40 | 80 | 40 | 80 | — |
| | Diameter (mm) | 1.5 | 1.5 | 4.0 | 4.0 | 4.0 | 4.0 | — |
| | Material | Ni | Ni | Ni | Ni | Ni SUS304 | Ni SUS304 | — |
| Frequency (kHz) | | 35.7 | 37.5 | 48.6 | 62.2 | 8.0 | 36.0 | 98 |
| Effective area*[3] (mm) | | 1.4 | 1.4 | 3.8 | 3.8 | 3.8 | 3.8 | 0.1 |
| CV*[4] (%) | | 2.5 | 2.3 | 4.6 | 4.5 | 4.5 | 6.3 | 18.5 |

*[1]Corresponds to the peripheral portion 102 for Ex. 1 through 6, and the entire thin film for Comp. Ex.
*[2]Corresponds to the center portion 101.
*[3]Refers to the area of the thin film in which the holes form droplets of desired dimensions.
*[4]Indicates the relative dispersion in droplet size distribution.

The toner according to this disclosure is evaluated in the following procedure, described in Examples 7 and 8.

Example 7

Preparation of Colorant Dispersion

First, a carbon black dispersion was prepared.

Seventeen parts of carbon black (Regal 400 from Cabot Corp.), 3 parts of a pigment dispersant (AJISPER PB821 from Ajinomoto Fine-Techno Co., Inc.) and 80 parts of ethylacetate were primarily dispersed by a mixer having an agitation blade to prepare a primary dispersion. The primary dispersion was more dispersed with higher shearing strength by a dyno-mill to prepare a secondary dispersion completely free from aggregates having a size not less than 5 μm.

(Preparation of Wax Dispersion)

Next, a wax dispersion was prepared.

Eighteen parts of carnauba wax, 2 parts of a wax dispersant (a polyethylene wax grafted with a styrene-butylacrylate copolymer) and 80 parts of ethylacetate were primarily dispersed by a mixer having an agitation blade to prepare a primary dispersion to prepare a primary dispersion. After the primary dispersion was heated to have a temperature of 80° C. while agitated to dissolve the carnauba wax, the dispersion was cooled to have a room temperature and wax particles having a maximum diameter not greater than 3 μm were precipitated. The primary dispersion was more dispersed with higher shearing strength by a dyno-mill such that the wax particles have a maximum diameter not greater than 2 μm.

(Preparation of Toner Constituent Dispersion)

Next, a toner constituent dispersion including a binder resin, the colorant dispersion and the wax dispersion was prepared.

One hundred parts of a polyester resin, 30 parts of the colorant dispersion, 30 parts of the wax dispersion, and 840 parts of ethylacetate were agitated for 10 minutes to be uniformly dispersed by a mixer having an agitation blade to prepare a dispersion. The pigment and wax did not aggregate with the solvent. The dispersion had an electroconductivity of $1.8\times10^{-7}$ S/m.

(Preparation of Toner)

The dispersion was fed into the spray unit 2 configured in a manner similar to that depicted in Example 1. Droplets were dispensed under the following conditions, and solidified by drying to prepare toner particles.

Dispensing Conditions

Specific gravity of the dispersion ($g/cm^3$): 1.154

Dry air (nitrogen gas) flow rate (L/min.): 2.0 for dispersion, and 30.0 for the drying chamber Dry entrance temperature (° C.): 60

Dry exit temperature (° C.): 45

Dew point (° C.): −20

Vibration frequency (kHz): 180

The toner particles were collected with a filter with pores having a diameter of 1 μm. The particle diameter distribution of the toner particles was measured by FPIA-2000 under the following conditions. The toner particles had a weight-average particle diameter (D4) of 5.5 μm and a number-average particle diameter (Dn) of 5.3 μm.

Example 8

Toner was prepared in a manner similar to that described in Example 7, except that the spray unit 2 was configured in a manner similar to that described in Example 4. The resultant toner particles had a weight-average particle diameter (D4) of 5.3 μm and a number-average particle diameter (Dn) of 5.0 μm.

(Evaluation of Toner)

As described above, the particle diameter distribution of the toner was evaluated using a flow particle image analyzer (FPIA-2100 from To a Medical Electronics Co., Ltd).

By way of example, a typical analyzing method using such a flow particle image analyzer is illustrated. First, a few drops of a nonion surfactant (preferably Contaminon from Wako Pure Chemical Industries, Ltd.) are added to 10 ml of water which is filtered such that a microscopic dust is removed therefrom to include 20 or less of particles in a measurement range, e.g., having a circle-equivalent diameter of from 0.60 to less than 159.21 μm in a volume of $10^{-3}$ $cm^3$ to prepare a mixture. Further, 5 mg of a sample are added thereto and the mixture is dispersed by an ultrasonic disperser UH-50 from STM Corp. at 20 kHz, 50 W/10 $cm^3$ for 1 min. to prepare a dispersion. The dispersion is further dispersed for totally 5 min. to include the particles having a circle-equivalent diameter of from 0.60 to less than 159.21 μm in an amount of 4,000 to 8,000 particles/$10^{-3}$ $cm^3$ and the particle diameter distribution thereof was measured.

The sample dispersion is passed through a flow path (expanding along the flowing direction) of a flat and transparent flow cell (having a thickness of approximately 200 μm). A strobe light and a CCD camera are located facing each other across the flow cell to form a light path passing across the thickness of the flow cell. While the sample dispersion flows, strobe light is irradiated to the particles at an interval of 1/30 sec. to obtain images thereof flowing on the flow cell, and therefore a two-dimensional image of each particle having a specific scope parallel to the flow cell is photographed. From the two-dimensional image, the diameter of a circle having the same area is determined as a circle-equivalent diameter.

The circle-equivalent diameters of 1,200 or more of the particles can be measured and a ratio (% by number) of the particles have a specified circle-equivalent diameter can be measured.

The toner according to this disclosure was manufactured with excellent efficiency and enhanced properties. Excellent image quality with high definition could be obtained by using this toner in electrophotographic development.

The granulation apparatus and method according to this disclosure may be implemented to provide good production efficiency and enhanced homogeneity and/or monodispersibility of toner particles. Thus, toner manufactured by the granulation process according to this disclosure has substantially uniform quality, such as flowability and charging property, which may contribute to excellent developing performance in image forming applications such as electrophotography, electrostatic recording, electrostatic printing, and the like.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2007-127691 filed on May 14, 2007 in the Japanese Patent Office, the entire contents of which are hereby incorporated by reference herein.

What is claimed is:

1. A method for manufacturing toner, comprising:

supplying a liquid to be atomized, the liquid including at least a resin and a colorant;

periodically dispensing droplets of the liquid through an atomizing unit; and solidifying the dispensed droplets into toner particles, the atomizing unit including:

a membrane having a first portion and a second portion, the second portion being more elastic than the first portion which is stiffer than the second portion, the membrane contacting the liquid when the droplets are being dispensed;

a vibration actuator connected to and supporting a periphery of the membrane, the vibration actuator inducing vibration of the membrane to cause the droplets to be dispensed; and multiple nozzles formed in the first portion which is stiffer than the second portion, the multiple nozzles discharging droplets therethrough when the membrane vibrates.

2. The method according to claim 1, wherein the membrane is circular in shape and has a stiffness that varies symmetrically about a central axis.

3. The method according to claim 2, wherein the membrane has a thickness that varies symmetrically about the central axis.

4. The method according to claim 3, wherein the thickness of the membrane is locally maximal in a center portion thereof.

5. The method according to claim 2, wherein the membrane is vibrated without forming a vibration node along a diameter thereof.

6. The method according to claim 1, wherein the membrane is vibrated at a frequency in a range of 20 kilohertz to 2.0 megahertz.

7. The method according to claim 1, wherein the membrane is vibrated to develop a pressure in a range of 10 kilopascal to 500 kilopascal in the liquid adjacent to the multiple nozzles.

8. The method according to claim 1, wherein the multiple nozzles are located in a region in which the membrane has a ratio of a maximal displacement amplitude to a minimum displacement amplitude of not greater than 2.0.

9. The method according to claim 1, wherein the membrane is formed of metal with a thickness in a range of 5 μm to 500 μm, and each of the multiple nozzles has an opening diameter in a range of 3 μm to 35 μm.

10. A granulation apparatus for use in toner manufacture, comprising:

a reservoir that supplies a liquid to be atomized, the liquid including at least a resin and a colorant;

an atomizing unit that periodically dispenses droplets of the liquid; and a solidification unit that solidifies the dispensed droplets into toner particles, the atomizing unit including:

a membrane having a first portion and a second portion, the second portion being more elastic than the first portion which is stiffer than the second portion, the membrane contacting the liquid when the droplets are being dispensed;

a vibration actuator connected to and supporting a periphery of the membrane, the vibration actuator inducing vibration of the membrane to cause the droplets to be dispensed; and multiple nozzles formed in the first portion which is stiffer than the second portion, the multiple nozzles discharging droplets therethrough when the membrane vibrates.

11. The granulation apparatus according to claim 10, wherein the membrane is circular in shape and has a stiffness that varies symmetrically about a central axis.

12. The granulation apparatus according to claim 11, wherein the membrane has a thickness that varies symmetrically about the central axis.

13. The granulation apparatus according to claim 12, wherein the thickness of the membrane is locally maximal in a center portion thereof.

14. The granulation apparatus according to claim 11, wherein the membrane vibrates without forming a vibration node along a diameter.

15. The granulation apparatus according to claim 10, wherein the membrane vibrates at a frequency in a range of 20 kilohertz to 2.0 megahertz.

16. The granulation apparatus according to claim 10, wherein the membrane is vibrated to develop a pressure in a range of 10 kilopascal to 500 kilopascal in the liquid adjacent to the multiple nozzles.

17. The granulation apparatus according to claim 10, wherein the multiple nozzles are located in a region in which the membrane has a ratio of a maximal displacement amplitude to a minimum displacement amplitude of not greater than 2.0.

18. The granulation apparatus according to claim 10, wherein the membrane is formed of metal with a thickness in a range of 5 μm to 500 μm, and each of the multiple nozzles has an opening diameter in a range of 3 μm to 35 μm.

* * * * *